(12) United States Patent
Yamada et al.

(10) Patent No.: US 9,642,095 B2
(45) Date of Patent: May 2, 2017

(54) COMMUNICATION STATUS OUTPUT APPARATUS, COMMUNICATION STATUS OUTPUT METHOD, COMMUNICATION STATUS OUTPUT PROGRAM, AND TRANSMISSION MODULE

(71) Applicant: OMRON Corporation, Kyoto-shi, Kyoto (JP)

(72) Inventors: Ryota Yamada, Kyotanabe (JP); Yusuke Yamaji, Ikoma (JP); Hajime Umeki, Kyoto (JP); Yuki Inoue, Sakai (JP)

(73) Assignee: OMRON Corporation, Kyoto-shi (JP)

( * ) Notice: Subject to any disclaimer, the term of this patent is extended or adjusted under 35 U.S.C. 154(b) by 0 days.

(21) Appl. No.: 15/119,153

(22) PCT Filed: Feb. 26, 2015

(86) PCT No.: PCT/JP2015/055577
§ 371 (c)(1),
(2) Date: Aug. 16, 2016

(87) PCT Pub. No.: WO2015/137134
PCT Pub. Date: Sep. 17, 2015

(65) Prior Publication Data
US 2017/0013567 A1    Jan. 12, 2017

(30) Foreign Application Priority Data

Mar. 14, 2014  (JP) .................................. 2014-052407

(51) Int. Cl.
*H03C 1/62* (2006.01)
*H04W 52/24* (2009.01)
(Continued)

(52) U.S. Cl.
CPC ........ *H04W 52/243* (2013.01); *H04B 17/318* (2015.01); *H04W 52/228* (2013.01); *H04W 52/245* (2013.01); *H04W 72/1231* (2013.01)

(58) Field of Classification Search
CPC ..... H04W 84/18; H04W 24/10; H04W 4/008; H04W 52/228; H04W 52/245;
(Continued)

(56) References Cited

U.S. PATENT DOCUMENTS

2005/0282506 A1* 12/2005 Azuma ................ H04B 7/0615
455/115.1

FOREIGN PATENT DOCUMENTS

JP        2004-064133 A    2/2004

* cited by examiner

*Primary Examiner* — Tu X Nguyen
(74) *Attorney, Agent, or Firm* — Mots Law, PLLC

(57) ABSTRACT

When a status of communication between a first transmission module and a second transmission module that is located downstream of the first transmission module on a predetermined transmission path is output, received signal strength information is output for each piece of send target information in order of transmission, and regarding this output, an interval between output of received signal strength information associated with send target information transmitted immediately before transmission of one piece of send target information and output of received signal strength information associated with the one piece of send target information corresponds to a transmission period of the one piece of send target information from the first transmission module to the second transmission module. This makes it easy to grasp a status of communication between arbitrary transmission modules in a network in which information is transmitted sequentially via a plurality of transmission modules along a predetermined transmission path.

13 Claims, 15 Drawing Sheets

(51) Int. Cl.
*H04B 17/318* (2015.01)
*H04W 52/22* (2009.01)
*H04W 72/12* (2009.01)

(58) Field of Classification Search
CPC ........... H04W 52/283; H04W 72/1231; H04W 74/04; H04W 88/02
USPC .............................. 455/115.4, 124, 137, 141
See application file for complete search history.

| Area a4 (Data) | Tempa | Tempb |
| --- | --- | --- |

| Area a6 (Appended Data) | | tsa Ssa | trb Srb | tsb Ssb |
| --- | --- | --- | --- | --- |

2A    2B (b)

| Area a4 (Data) | Tempa | Tempb | Tempc |
| --- | --- | --- | --- |

| Area a6 (Appended Data) | | tsa Ssa | trb Srb | tsb Ssb | trc Src | tsc Ssc |
| --- | --- | --- | --- | --- | --- | --- |

2A    2B    2C (a)

(b)

(a)

(b)

COMMUNICATION STATUS OUTPUT APPARATUS, COMMUNICATION STATUS OUTPUT METHOD, COMMUNICATION STATUS OUTPUT PROGRAM, AND TRANSMISSION MODULE

TECHNICAL FIELD

The present invention relates to a communication status output apparatus, a communication status output method, a communication status output program, and a transmission module that output the status of communication between transmission modules in a network.

RELATED ART

Conventionally, techniques have been developed that cause sensor modules to measure environment parameters, such as a temperature and humidity, and send measurement information corresponding to the measured values to an information processing apparatus via a wireless network. This enables easy collection of measurement information related to many environment parameters. In this case, these sensor modules are provided with a wireless function, and thus these sensor modules function as transmission modules. The wireless network for transmission of measurement information is formed by enabling communication between the transmission modules.

Patent Document 1 discloses a communication status analysis method as a technique related to a wireless network. With this method, the following pieces of information are stored to a storage unit in association with one or both of a wireless signal sent from a wireless network access apparatus and a wireless signal sent from a terminal apparatus: information on output power of the wireless signal(s), information on the strength of the wireless signal(s) measured by the wireless network access apparatus or the terminal apparatus that receives the wireless signal(s), position information of the wireless network access apparatus, and position information of the terminal apparatus. Then, on the basis of the pieces of information stored in the storage unit, a communication status in the wireless network is analyzed on a per-position basis. This communication status analysis method disclosed in Patent Document 1 executes, in the course of analysis, processing for visualizing a communication status in the wireless network on a per-position basis. Specifically, the method executes processing for presenting a positional relationship between the apparatuses, an inter-apparatus distance, and a wireless signal strength between the apparatuses (a signal attenuation rate between the apparatuses) by projection on an X-Y plane.

RELATED ART DOCUMENTS

Patent Documents

Patent Document 1: JP 2004-64133A

SUMMARY OF THE INVENTION

Problem to be Solved by the Invention

A network in which send target information, which is information to be transmitted, is transmitted to a destination via a plurality of transmission modules along a predetermined transmission path may undergo not only abnormalities such as a decrease in received signal strength at the time of reception of information by a certain transmission module, but also abnormalities such as a fluctuation in a sending/receiving interval of information that is to be sent/received repeatedly on a regular basis between certain transmission modules.

If such communication abnormalities have occurred in the network, it is necessary to specify which part of the transmission path in the network is undergoing the abnormalities in order to take measures against the abnormalities. Furthermore, in order to specify the part that is undergoing the abnormalities, it is necessary to grasp the status of communication between transmission modules in the network.

However, with a conventional communication status analysis method such as that described in Patent Document 1, when send target information is transmitted repeatedly along a predetermined transmission path, it is difficult to grasp a communication status for each piece of send target information. Furthermore, this conventional communication status analysis method cannot visualize an interval at which send target information is sent/received between transmission modules. This makes it difficult to grasp an abnormality in an interval at which send target information is sent/received between certain transmission modules.

The present invention has been made in view of the above problems, and aims to provide a technique that makes it easy to grasp the status of communication between arbitrary transmission modules in a network in which information is transmitted sequentially via a plurality of transmission modules along a predetermined transmission path.

Means for Solving the Problems

In order to address the above problems, a first invention adopts the following configuration for a communication status output apparatus that outputs a status of communication between a first transmission module and a second transmission module, which is located downstream of the first transmission module, in a network in which send target information is transmitted sequentially via a plurality of transmission modules along a predetermined transmission path: one pair of pieces of sending/receiving information, which is composed of sending power information and received signal strength information associated with sending/receiving of one piece of send target information between the first transmission module and the second transmission module, is output for each piece of send target information in order of transmission, and regarding this output, the sending power information and the received signal strength information are output in such a manner that an interval therebetween corresponds to a transmission period of the one piece of send target information from the first transmission module to the second transmission module. This makes it possible to grasp not only a communication status for each piece of send target information, but also a change in a transmission period of send target information between transmission modules. Therefore, the status of communication between transmission modules in the network can easily be grasped.

Note that according to the present invention, the first transmission module and the second transmission module are arbitrary transmission modules on the predetermined transmission path in the network, and they may be any of transmission modules in the network as long as the second transmission module is located downstream of the first transmission module on the predetermined transmission path. That is to say, the second transmission module may be located immediately downstream of the first transmission module on the predetermined transmission path. Furthermore, (at least one) another transmission module may be interposed between the first transmission module and the second transmission module on the predetermined transmission path. In this case, send target information sent from the first transmission module is transmitted to the second transmission module via another transmission module.

Specifically, the present invention is a communication status output apparatus that outputs a status of communication between a first transmission module and a second transmission module in a network in which send target information is transmitted sequentially via a plurality of transmission modules along a predetermined transmission path, the second transmission module being located downstream of the first transmission module on the predetermined transmission path, and the send target information being information to be processed by an information processing apparatus or information already processed by the information processing apparatus. The communication status output apparatus includes an obtaining unit that obtains sending power information corresponding to sending power at the time of sending of send target information from the first transmission module, received signal strength information corresponding to received signal strength at the time of reception of send target information sent from the first transmission module by the second transmission module, and transmission period information corresponding to a transmission period between sending of send target information from the first transmission module and reception of the send target information by the second transmission module; and an output unit that outputs one pair of pieces of sending/receiving information for each piece of send target information in order of transmission, the one pair of pieces of sending/receiving information being composed of the sending power information and the received signal strength information associated with sending/receiving of one piece of send target information between the first transmission module and the second transmission module. In outputting the pieces of sending/receiving information associated with the one piece of send target information, the output unit outputs the sending power information and the received signal strength information in such a manner that an interval therebetween corresponds to a transmission period between sending of the one piece of send target information from the first transmission module and reception of the one piece of send target information by the second transmission module.

According to the present invention, the predetermined transmission path is formed by a plurality of transmission modules in the network functioning as relays. Note that the predetermined transmission path is formed by transmission modules serving as relays that are located at a start point and an end point of the predetermined transmission path, and between the start point and the end point. However, according to the present invention, the predetermined transmission path is not limited to a specific path. That is to say, the predetermined transmission path may be a path that has been determined in advance, or may be a path that is determined as needed, in consideration of an information transmission environment, when a transmission module that has received information transmits information to a transmission module located downstream thereof. Note that the network according to the present invention may be a wireless network or a wired network.

According to the present invention, information transmitted by transmission modules is information to be processed by the information processing apparatus on the predetermined transmission path, or information that has been processed by the information processing apparatus, and is referred to as send target information. Note that the form of processing applied by the information processing apparatus to send target information is not limited to a specific form.

According to the present invention, send target information sent from the start point of the predetermined transmission path is transmitted sequentially via transmission modules that form the predetermined transmission path. The communication status output apparatus according to the present invention outputs the status of communication between the first transmission module and the second transmission module, which are two arbitrary transmission modules on the predetermined transmission path.

Parameters indicating the status of communication between the first transmission module and the second transmission module include sending power at the time of sending of send target information from the first transmission module, received signal strength at the time of reception of the send target information by the second transmission module, and a transmission period between sending of the send target information from the first transmission module and reception of the send target information by the second transmission module. In view of this, according to the present invention, the obtaining unit obtains sending power information, received signal strength information, and transmission period information that correspond to these parameters.

According to the present invention, the output unit outputs one pair of pieces of sending/receiving information composed of sending power information and received signal strength information which have been obtained by the obtaining unit and which are associated with sending/receiving of one piece of send target information between the first transmission module and the second transmission module. That is to say, the output unit outputs sending power information corresponding to sending power at the time of sending of one piece of send target information from the first transmission module, and received signal strength information corresponding to received signal strength at the time of reception of the one piece of send target information by the second transmission module, as one pair. At this time, pieces of sending/receiving information associated with each piece of send target information that is transmitted sequentially between the first transmission module and the second transmission module are output by the output unit in order of transmission.

Furthermore, the output unit outputs sending power information and received signal strength information that compose one pair of pieces of sending/receiving information associated with one piece of send target information in such a manner that an interval therebetween corresponds to a transmission period between sending of the one piece of send target information from the first transmission module and reception of the one piece of send target information by the second transmission module. As the output unit outputs pieces of sending/receiving information in the foregoing manner, a user can perceive, for each piece of sending power information, the magnitude of sending power at the time of sending from the first transmission module on the basis of sending power information, and the magnitude of received signal strength at the time of reception by the second transmission module on the basis of received signal strength information. The user can also perceive a transmission period of each piece of sending power information from the first transmission module to the second transmission module on the basis of an interval between output of the sending power information and output of the received signal strength information.

Note that according to the present invention, the form of output of pieces of sending/receiving information by the output unit is not limited to a specific form of output. They may be output in any form as long as the user can perceive the magnitude of sending power, the magnitude of received signal strength, and the length of a transmission period on the basis of sending power information, received signal strength information, and an interval between output of the sending power information and output of the received signal strength information as stated earlier. For example, when the output unit includes a display unit that displays an image, pieces of sending/receiving information may be output as a predetermined image. Alternatively, pieces of sending/receiving information may be output as light emitted by a predetermined light source, or as sound from a predetermined sound source.

As described above, according to the present invention, the user can perceive, for every single piece of send target information, the magnitude of sending power at the time of sending from the first transmission module, the magnitude of received signal strength at the time of reception by the second transmission module, and a transmission period between the first transmission module and the second transmission module. Therefore, the status of communication between the first transmission module and the second transmission module can easily be grasped for every single piece of send target information.

The present invention may adopt the following configuration: each transmission module includes a receiving unit that receives send target information from an immediately upstream transmission module that is located immediately upstream of the own transmission module on the predetermined transmission path, and a sending unit that transmits send target information to an immediately downstream transmission module that is located immediately downstream of the own transmission module on the predetermined transmission path. In this configuration, the receiving unit may receive, together with send target information, sending power information at the time of sending of the send target information from each of the immediately upstream transmission module and an upstream transmission module that is located upstream of the immediately upstream transmission module, as well as sending time information corresponding to time of sending of the send target information from each of the immediately upstream transmission module and the upstream transmission module. Furthermore, the sending unit may transmit, together with send target information, sending power information at the time of sending of the send target information from each of the own transmission module, the immediately upstream transmission module, and the upstream transmission module, as well as sending time information corresponding to time of sending of the send target information from each of the own transmission module, the immediately upstream transmission module, and the upstream transmission module.

Note that in the present application, the "own transmission module" is a term that is used to specify a transmission module on the predetermined transmission path. Specifically, a transmission module is referred to as the "own transmission module" to specify itself on the basis of one reference transmission module that belongs to the predetermined transmission path. Furthermore, among a plurality of transmission modules that are located upstream of the own transmission module along the flow of information on the predetermined transmission path, a transmission module that is located immediately upstream of the own transmission module is referred to as the "immediately upstream transmission module" (that is to say, no other transmission module is interposed between the own transmission module and the immediately upstream transmission module), and a transmission module that is located upstream of the immediately upstream transmission module is referred to as the "upstream transmission module." Similarly, among a plurality of transmission modules that are located downstream of the own transmission module along the flow of information on the predetermined transmission path, a transmission module that is located immediately downstream of the own transmission module is referred to as the "immediately downstream transmission module" (that is to say, no other transmission module is interposed between the own transmission module and the immediately downstream transmission module). That is to say, the terms "own transmission module," "immediately upstream transmission module", "upstream transmission module," and "immediately downstream transmission module" are based on relative positional relationships among transmission modules on the predetermined transmission path. Therefore, the terms "own transmission module," "immediately upstream transmission module," "upstream transmission module," and "immediately downstream transmission module" specify transmission modules differently for different reference transmission modules. In passages where transmission modules are described, a transmission module that need not be distinguished between the "own transmission module," "immediately upstream transmission module," "upstream transmission module," and "immediately downstream transmission module" is simply referred to as a "transmission module."

With the above configuration, the receiving unit of the own transmission module receives each piece of send target information sent from the immediately upstream transmission module, together with sending power information and sending time information in each of the immediately upstream transmission module and the upstream transmission module associated with the piece of send target information. Furthermore, the sending unit of the own transmission module sends each piece of send target information to the immediately downstream transmission module, together with sending power information and sending time information in each of the immediately upstream transmission module and the upstream transmission module associated with the piece of send target information, as well as sending power information and sending time information in the own transmission module associated with each piece of send target information. That is to say, when one piece of send target information is transmitted on the predetermined transmission path, sending power information and sending time information in each transmission module associated with the one piece of send target information are transmitted together with the one piece of send target information.

As stated earlier, according to the present invention, two arbitrary transmission modules are selected as the first transmission module and the second transmission module whose communication status is to be output on the predetermined transmission path. Here, the first transmission module is located upstream of the second transmission module. That is to say, provided that the second transmission module is the own transmission module, the first transmission module is the immediately upstream transmission module or the upstream transmission module. Therefore, in the case of the above configuration, the second transmission module receives sending power information at the time of sending of send target information from the first transmission module, and sending time information at the time of sending of send target information from the first transmission module.

The own transmission module can also obtain received signal strength information corresponding to received signal strength at the time of reception of send target information from the immediately upstream transmission module by the receiving unit in the own transmission module. The own transmission module can also obtain receiving time information corresponding to the time of reception of send target information from the immediately upstream transmission module by the receiving unit in the own transmission module. Therefore, in the case of the above configuration, the second transmission module can obtain received signal strength information at the time of reception of send target information by the second transmission module, and receiving time information corresponding to the time of reception of the send target information by the second transmission module.

In view of this, in the case of the above configuration, the obtaining unit may obtain, from the second transmission module, sending power information at the time of sending of send target information from the first transmission module, sending time information at the time of sending of the send target information from the first transmission module, received signal strength information at the time of reception of the send target information by the second transmission module, and receiving time information corresponding to the time of reception of the send target information by the second transmission module. By obtaining such sending time information and receiving time information, the obtaining unit can obtain transmission period information associated with the send target information on the basis of a difference between the time of sending of the send target information from the first transmission module and the time of reception of the send target information by the second transmission module.

As stated earlier, according to the present invention, the first transmission module may be immediately upstream of the second transmission module. In this case, information sent from the first transmission module is received directly by the second transmission module without making a stop at another transmission module. Therefore, when communication between the first transmission module and the second transmission module is normal, a constant correlation is established between the magnitude of sending power at the time of sending of one piece of send target information from the first transmission module and the magnitude of received signal strength at the time of reception of the one piece of send target information by the second transmission module. That is to say, a correlation between sending power at the time of sending of one piece of send target information from the first transmission module and received signal strength at the time of reception of the one piece of send target information by the second transmission module can be one parameter indicating the status of communication between the first transmission module and the second transmission module.

In view of this, when the first transmission module is immediately upstream of the second transmission module, the output unit may output pieces of sending/receiving information associated with one piece of send target information as follows: sending power information and received signal strength information are output in such a form that a correlation between sending power at the time of sending of the one piece of send target information from the first transmission module and received signal strength at the time of reception of the one piece of send target information by the second transmission module corresponds to a correlation between sending power information and received signal strength information associated with sending/receiving of the one piece of send target information. In this way, the user can perceive a correlation between sending power at the time of sending of send target information from the first transmission module and received signal strength at the time of reception of the send target information by the second transmission module on the basis of a correlation between sending power information and received signal strength information. Therefore, the status of communication between the first transmission module and the second transmission module can be grasped also on the basis of a correlation between sending power at the time of sending of send target information from the first transmission module and received signal strength at the time of reception of the send target information by the second transmission module.

According to the present invention, the output unit may include a display unit that displays pieces of sending/receiving information in the form of pulses. In this case, in displaying pieces of sending/receiving information associated with one piece of send target information, the display unit displays the magnitude of sending power at the time of sending of the one piece of send target information from the first transmission module as the magnitude of a sending pulse indicating sending power information, and displays the magnitude of received signal strength at the time of reception of the one piece of send target information by the second transmission module as the magnitude of a receiving pulse indicating received signal strength information. The display unit also displays one pair of the sending pulse and the receiving pulse indicating the pieces of sending/receiving information associated with the one piece of send target information in such a manner that an interval therebetween corresponds to a transmission period between sending of the one piece of send target information from the first transmission module and reception of the one piece of send target information by the second transmission module.

In this way, the user can perceive the magnitude of sending power at the time of sending of send target information from the first transmission module and the magnitude of received signal strength at the time of reception of the send target information by the second transmission module on the basis of the magnitudes of a sending pulse and a receiving pulse displayed on the display unit. The user can also perceive a transmission period between sending of send target information from the first transmission module and reception of the send target information by the second transmission module on the basis of a display interval between one pair of transmission and receiving pulses displayed on the display unit.

According to the present invention, when the output unit includes the above display unit and a time axis indicating the passage of time is displayed on the display unit, the display unit may display a sending pulse and a receiving pulse indicating pieces of sending/receiving information for every single piece of send target information in such a manner that the pulses are lined up along the time axis in order of transmission of each piece of send target information on the predetermined transmission path. In this case, the displayed sending pulse and receiving pulse may project in opposite directions from each other with respect to the time axis.

As the display unit displays a sending pulse and a receiving pulse indicating pieces of sending/receiving information for every single piece of send target information in such a manner that the pulses are lined up along the time axis in order of transmission of each piece of send target information on the predetermined transmission path, a temporal change in the status of communication between the first transmission module and the second transmission module can easily be grasped. Furthermore, the displayed sending pulse and receiving pulse project in opposite directions from each other with respect to the time axis. This makes it easy for the user to view a sending pulse and a receiving pulse indicating pieces of sending/receiving information for every single piece of send target information.

In order to address the above problems, a second invention adopts the following configuration for a communication status output apparatus that outputs a status of communication between a first transmission module and a second transmission module, which is located downstream of the first transmission module, in a network in which send target information is transmitted sequentially via a plurality of transmission modules along a predetermined transmission path: received signal strength information is output for each piece of send target information in order of transmission, and regarding this output, an interval between output of received signal strength information associated with send target information transmitted immediately before transmission of one piece of send target information and output of received signal strength information associated with the one piece of send target information corresponds to a transmission period of the one piece of send target information from the first transmission module to the second transmission module. This makes it possible to grasp not only a communication status for each piece of send target information, but also a change in a transmission period of send target information between transmission modules. Therefore, the status of communication between transmission modules in the network can easily be grasped.

Specifically, the present invention is a communication status output apparatus that outputs a status of communication between a first transmission module and a second transmission module in a network in which send target information is transmitted sequentially via a plurality of transmission modules along a predetermined transmission path, the second transmission module being located downstream of the first transmission module on the predetermined transmission path, and the send target information being information to be processed by an information processing apparatus or information already processed by the information processing apparatus. The communication status output apparatus includes an obtaining unit that obtains received signal strength information corresponding to received signal strength at the time of reception of send target information sent from the first transmission module by the second transmission module, and transmission period information corresponding to a transmission period between sending of send target information from the first transmission module and reception of the send target information by the second transmission module; and an output unit that outputs the received signal strength information for each piece of send target information in order of transmission. The output unit outputs the received signal strength information associated with one piece of send target information in such a manner that an interval between output of the received signal strength information associated with send target information transmitted immediately before transmission of the one piece of send target information and output of the received signal strength information associated with the one piece of send target information corresponds to a transmission period between sending of the one piece of send target information from the first transmission module and reception of the one piece of send target information by the second transmission module.

According to the present invention, the obtaining unit obtains received signal strength information and transmission period information for each piece of send target information. Then, the output unit outputs received signal strength information obtained by the obtaining unit for each piece of send target information in order of transmission. At this time, the output unit performs the output in such a manner that an interval between output of received signal strength information associated with send target information transmitted immediately before transmission of one piece of send target information and output of received signal strength information associated with the one piece of send target information corresponds to a transmission period between sending of the one piece of send target information from the first transmission module and reception of the one piece of send target information by the second transmission module. As the output unit outputs received signal strength information for each piece of send target information in the foregoing manner, the user can perceive, for each piece of send target information, the magnitude of received signal strength at the time of reception by the second transmission module on the basis of received signal strength information. The user can also perceive a transmission period of each piece of send target information from the first transmission module to the second transmission module on the basis of an interval of output of received signal strength information.

Note that according to the present invention, the form of output of received signal strength information by the output unit is not limited to a specific form of output, similarly to the first invention. Received signal strength information may be output in any form as long as the user can perceive the magnitude of received signal strength and the length of a transmission period on the basis of received signal strength information and an interval of output of received signal strength information as stated earlier. For example, when the output unit includes a display unit that displays an image, received signal strength information may be output as a predetermined image. Alternatively, received signal strength information may be output as light emitted by a predetermined light source, or as sound from a predetermined sound source.

As described above, according to the present invention, the user can perceive, for every single piece of send target information, the magnitude of received signal strength at the time of reception by the second transmission module, and a transmission period between the first transmission module and the second transmission module. Therefore, the status of communication between the first transmission module and the second transmission module can easily be grasped for every single piece of send target information.

The present invention may adopt the following configuration: each transmission module includes a receiving unit that receives send target information from an immediately upstream transmission module that is located immediately upstream of the own transmission module on the predetermined transmission path, and a sending unit that transmits send target information to an immediately downstream transmission module that is located immediately downstream of the own transmission module on the predetermined transmission path. In this configuration, the receiving unit may receive, together with send target information, sending time information corresponding to time of sending of the send target information from each of the immediately upstream transmission module and an upstream transmission module. Furthermore, the sending unit may transmit, together with send target information, sending time information corresponding to time of sending of the send target information from each of the own transmission module, the immediately upstream transmission module, and the upstream transmission module.

With the above configuration, the receiving unit of the own transmission module receives each piece of send target information sent from the immediately upstream transmission module, together with sending time information in each of the immediately upstream transmission module and the upstream transmission module associated with the piece of send target information. Furthermore, the sending unit of the own transmission module sends each piece of send target information to the immediately downstream transmission module, together with sending time information in each of the immediately upstream transmission module and the upstream transmission module associated with the piece of send target information, as well as sending time information in the own transmission module associated with each piece of send target information. That is to say, when one piece of send target information is transmitted on the predetermined transmission path, sending time information in each transmission module associated with the one piece of send target information is transmitted together with the one piece of send target information.

Therefore, in the case of the above configuration, the second transmission module receives sending time information at the time of sending of send target information from the first transmission module. The second transmission module can also obtain received signal strength information at the time of reception of send target information by the second transmission module, and receiving time information corresponding to the time of reception of the send target information by the second transmission module. In view of this, in the case of the above configuration, the obtaining unit may obtain, from the second transmission module, sending time information at the time of sending of the send target information from the first transmission module, received signal strength information at the time of reception of the send target information by the second transmission module, and receiving time information corresponding to the time of reception of the send target information by the second transmission module. Similarly to the case of the first invention, by obtaining such sending time information and receiving time information, the obtaining unit can obtain transmission period information associated with the send target information on the basis of a difference between the time of sending of the send target information from the first transmission module and the time of reception of the send target information by the second transmission module.

According to the present invention, the output unit may include a display unit that displays received signal strength information in the form of pulses. In this case, in displaying received signal strength information associated with one piece of send target information, the display unit displays the magnitude of received signal strength at the time of reception of the one piece of send target information by the second transmission module as the magnitude of a receiving pulse indicating received signal strength information. The display unit displays a receiving pulse indicating received signal strength information associated with send target information transmitted immediately before transmission of the one piece of send target information and a receiving pulse indicating received signal strength information associated with the one piece of send target information in such a manner that an interval therebetween corresponds to a transmission period between sending of the one piece of send target information from the first transmission module and reception of the one piece of send target information by the second transmission module.

In this way, the user can perceive the magnitude of received signal strength at the time of reception of send target information by the second transmission module on the basis of the magnitude of a receiving pulse displayed on the display unit. The user can also perceive a transmission period between sending of send target information from the first transmission module and reception of the send target information by the second transmission module on the basis of a display interval between two adjacent receiving pulses displayed on the display unit.

According to the present invention, when the output unit includes the above display unit and displays a receiving pulse indicating received signal strength information associated with send target information transmitted immediately before transmission of one piece of send target information and a receiving pulse indicating received signal strength information associated with the one piece of send target information in such a manner that the pulses are lined up along a time axis in order of transmission of each piece of send target information on the predetermined transmission path, the receiving pulse indicating the received signal strength information associated with the send target information transmitted immediately before transmission of the one piece of send target information and the receiving pulse indicating the received signal strength information associated with the one piece of send target information may be displayed as pulses that project in opposite directions from each other with respect to the time axis.

As the display unit displays a receiving pulse indicating received signal strength information associated with send target information transmitted immediately before transmission of one piece of send target information and a receiving pulse indicating received signal strength information associated with the one piece of send target information in such a manner that the pulses are lined up along the time axis in order of transmission of each piece of send target information on the predetermined transmission path, a temporal change in the status of communication between the first transmission module and the second transmission module can easily be grasped. Furthermore, a receiving pulse indicating received signal strength information associated with send target information transmitted immediately before transmission of one piece of send target information and a receiving pulse indicating received signal strength information associated with the one piece of send target information are displayed as pulses that project in opposite directions from each other with respect to the time axis. This makes it easy for the user to view a receiving pulse indicating received signal strength information for every single piece of send target information.

Furthermore, the first invention can also be construed as an invention of a communication status output method for outputting a status of communication between a first transmission module and a second transmission module in a network in which send target information is transmitted sequentially via a plurality of transmission modules along a predetermined transmission path. In this case, the invention of the present application is a communication status output method for outputting a status of communication between a first transmission module and a second transmission module in a network in which send target information is transmitted sequentially via a plurality of transmission modules along a predetermined transmission path, the second transmission module being located downstream of the first transmission module on the predetermined transmission path, and the send target information being information to be processed by an information processing apparatus or information already processed by the information processing apparatus. The communication status output method includes an obtaining step of obtaining sending power information corresponding to sending power at the time of sending of send target information from the first transmission module, received signal strength information corresponding to received signal strength at the time of reception of send target information sent from the first transmission module by the second transmission module, and transmission period information corresponding to a transmission period between sending of send target information from the first transmission module and reception of the send target information by the second transmission module; and an output step of outputting one pair of pieces of sending/receiving information for each piece of send target information in order of transmission, the one pair of pieces of sending/receiving information being composed of the sending power information and the received signal strength information associated with sending/receiving of one piece of send target information between the first transmission module and the second transmission module. In outputting the pieces of sending/receiving information associated with the one piece of send target information in the output step, the sending power information and the received signal strength information are output in such a manner that an interval therebetween corresponds to a transmission period between sending of the one piece of send target information from the first transmission module and reception of the one piece of send target information by the second transmission module. Note that the technical ideas that have been disclosed as the invention of the above communication status output apparatus are applicable to the invention of this communication status output method as long as no technical inconsistency arises.

Furthermore, the second invention can also be construed as an invention of a communication status output method for outputting a status of communication between a first transmission module and a second transmission module in a network in which send target information is transmitted sequentially via a plurality of transmission modules along a predetermined transmission path. In this case, the invention of the present application is a communication status output method for outputting a status of communication between a first transmission module and a second transmission module in a network in which send target information is transmitted sequentially via a plurality of transmission modules along a predetermined transmission path, the second transmission module being located downstream of the first transmission module on the predetermined transmission path, and the send target information being information to be processed by an information processing apparatus or information already processed by the information processing apparatus. The communication status output method includes an obtaining step of obtaining received signal strength information corresponding to received signal strength at the time of reception of send target information sent from the first transmission module by the second transmission module, and transmission period information corresponding to a transmission period between sending of send target information from the first transmission module and reception of the send target information by the second transmission module; and an output step of outputting the received signal strength information for each piece of send target information in order of transmission. In the output step, the received signal strength information associated with one piece of send target information is output in such a manner that an interval between output of the received signal strength information associated with send target information transmitted immediately before transmission of the one piece of send target information and output of the received signal strength information associated with the one piece of send target information corresponds to a transmission period between sending of the one piece of send target information from the first transmission module and reception of the one piece of send target information by the second transmission module. Note that the technical ideas that have been disclosed as the invention of the above communication status output apparatus are applicable to the invention of this communication status output method as long as no technical inconsistency arises.

Furthermore, the first invention can also be construed as an invention of a communication status output program for causing a communication status output apparatus to output a status of communication between a first transmission module and a second transmission module in a network in which send target information is transmitted sequentially via a plurality of transmission modules along a predetermined transmission path. In this case, the invention of the present application is a communication status output program for causing a communication status output apparatus to output a status of communication between a first transmission module and a second transmission module in a network in which send target information is transmitted sequentially via a plurality of transmission modules along a predetermined transmission path, the second transmission module being located downstream of the first transmission module on the predetermined transmission path, and the send target information being information to be processed by an information processing apparatus or information already processed by the information processing apparatus. The communication status output program causes the communication status output apparatus to execute an obtaining step of obtaining sending power information corresponding to sending power at the time of sending of send target information from the first transmission module, received signal strength information corresponding to received signal strength at the time of reception of send target information sent from the first transmission module by the second transmission module, and transmission period information corresponding to a transmission period between sending of send target information from the first transmission module and reception of the send target information by the second transmission module; and an output step of outputting one pair of pieces of sending/receiving information for each piece of send target information in order of transmission, the one pair of pieces of sending/receiving information being composed of the sending power information and the received signal strength information associated with sending/receiving of the one piece of send target information between the first transmission module and the second transmission module. When the communication status output apparatus outputs the pieces of sending/receiving information associated with the one piece of send target information in the output step, the communication status output program causes the sending power information and the received signal strength information to be output in such a manner that an interval therebetween corresponds to a transmission period between sending of the one piece of send target information from the first transmission module and reception of the one piece of send target information by the second transmission module. Note that the technical ideas that have been disclosed as the invention of the above communication status output apparatus are applicable to the invention of this communication status output program as long as no technical inconsistency arises.

Furthermore, the second invention can also be construed as an invention of a communication status output program for causing a communication status output apparatus to output a status of communication between a first transmission module and a second transmission module in a network in which send target information is transmitted sequentially via a plurality of transmission modules along a predetermined transmission path. In this case, the invention of the present application is a communication status output program for causing a communication status output apparatus to output a status of communication between a first transmission module and a second transmission module in a network in which send target information is transmitted sequentially via a plurality of transmission modules along a predetermined transmission path, the second transmission module being located downstream of the first transmission module on the predetermined transmission path, and the send target information being information to be processed by an information processing apparatus or information already processed by the information processing apparatus. The communication status output program causes the communication status output apparatus to execute an obtaining step of obtaining received signal strength information corresponding to received signal strength at the time of reception of send target information sent from the first transmission module by the second transmission module, and transmission period information corresponding to a transmission period between sending of send target information from the first transmission module and reception of the send target information by the second transmission module; and an output step of outputting the received signal strength information for each piece of send target information in order of transmission. The communication status output program may cause the communication status output apparatus to output the received signal strength information associated with the one piece of send target information in the output step in such a manner that an interval between output of the received signal strength information associated with send target information transmitted immediately before transmission of the one piece of send target information and output of the received signal strength information associated with the one piece of send target information corresponds to a transmission period between sending of the one piece of send target information from the first transmission module and reception of the one piece of send target information by the second transmission module. Note that the technical ideas that have been disclosed as the invention of the above communication status output apparatus are applicable to the invention of this communication status output program as long as no technical inconsistency arises.

Furthermore, the first invention can also be construed as an invention of a transmission module that is used in a network in which send target information is transmitted sequentially along a predetermined transmission path as stated earlier. In this case, the invention of the present application is a transmission module that is used in a network in which send target information is transmitted sequentially along a predetermined transmission path, and that outputs a status of communication between the own transmission module and an upstream transmission module located upstream of the own transmission module on the predetermined transmission path, the send target information being information to be processed by an information processing apparatus or information already processed by the information processing apparatus. The transmission module includes an obtaining unit that obtains sending power information corresponding to sending power at the time of sending of send target information from the upstream transmission module, received signal strength information corresponding to received signal strength at the time of reception of send target information sent from the upstream transmission module by the own transmission module, and transmission period information corresponding to a transmission period until the own transmission module receives send target information sent from the upstream transmission module; and an output unit that outputs one pair of pieces of sending/receiving information for each piece of send target information in order of transmission, the one pair of pieces of sending/receiving information being composed of the sending power information and the received signal strength information associated with sending/receiving of one piece of send target information between the upstream transmission module and the own transmission module. In outputting the pieces of sending/receiving information associated with the one piece of send target information, the output unit outputs the sending power information and the received signal strength information in such a manner that an interval therebetween corresponds to a transmission period until the own transmission module receives the one piece of send target information sent from the upstream transmission module. Note that the technical ideas that have been disclosed as the invention of the above communication status output apparatus are applicable to the invention of this transmission module as long as no technical inconsistency arises.

Furthermore, the second invention can also be construed as an invention of a transmission module that is used in a network in which send target information is transmitted sequentially along a predetermined transmission path as stated earlier. In this case, the invention of the present application is a transmission module that is used in a network in which send target information is transmitted sequentially along a predetermined transmission path, and that outputs a status of communication between the own transmission module and an upstream transmission module located upstream of the own transmission module on the predetermined transmission path, the send target information being information to be processed by an information processing apparatus or information already processed by the information processing apparatus. The transmission module includes an obtaining unit that obtains received signal strength information corresponding to received signal strength at the time of reception of send target information sent from the upstream transmission module by the own transmission module, and transmission period information corresponding to a transmission period until the own transmission module receives send target information sent from the upstream transmission module; and an output unit that outputs the received signal strength information for each piece of send target information in order of transmission. The output unit outputs the received signal strength information associated with one piece of send target information in such a manner that an interval between output of the received signal strength information associated with send target information transmitted immediately before transmission of the one piece of send target information and output of the received signal strength information associated with the one piece of send target information corresponds to a transmission period between sending of the one piece of send target information from the upstream transmission module and reception of the one piece of send target information by the own transmission module. Note that the technical ideas that have been disclosed as the invention of the above communication status output apparatus are applicable to the invention of this transmission module as long as no technical inconsistency arises.

Effects Of The Invention

The present invention makes it easy to grasp the status of communication between arbitrary transmission modules in a network.

BRIEF DESCRIPTION OF THE DRAWINGS

FIG. 6 is a diagram schematically showing data structures of information stored in an area a4 (Data) and an area a6 (Appended Data) of send information that is sent from and received by the own transmission module at the time of execution of the information transmission processing illustrated in FIG. 5.

EMBODIMENTS OF THE INVENTION

With reference to the drawings, a description is now given of a network system (or simply "system" hereinafter) 10 according to the present invention, transmission modules 2, 3 included in the system, and a communication status output apparatus 4 that outputs a communication status in the network. Note that the configurations of the following embodiments serve as examples, and the present invention is by no means limited to the configurations of the following embodiments.

Embodiment 1

System Configuration

Figure 1:
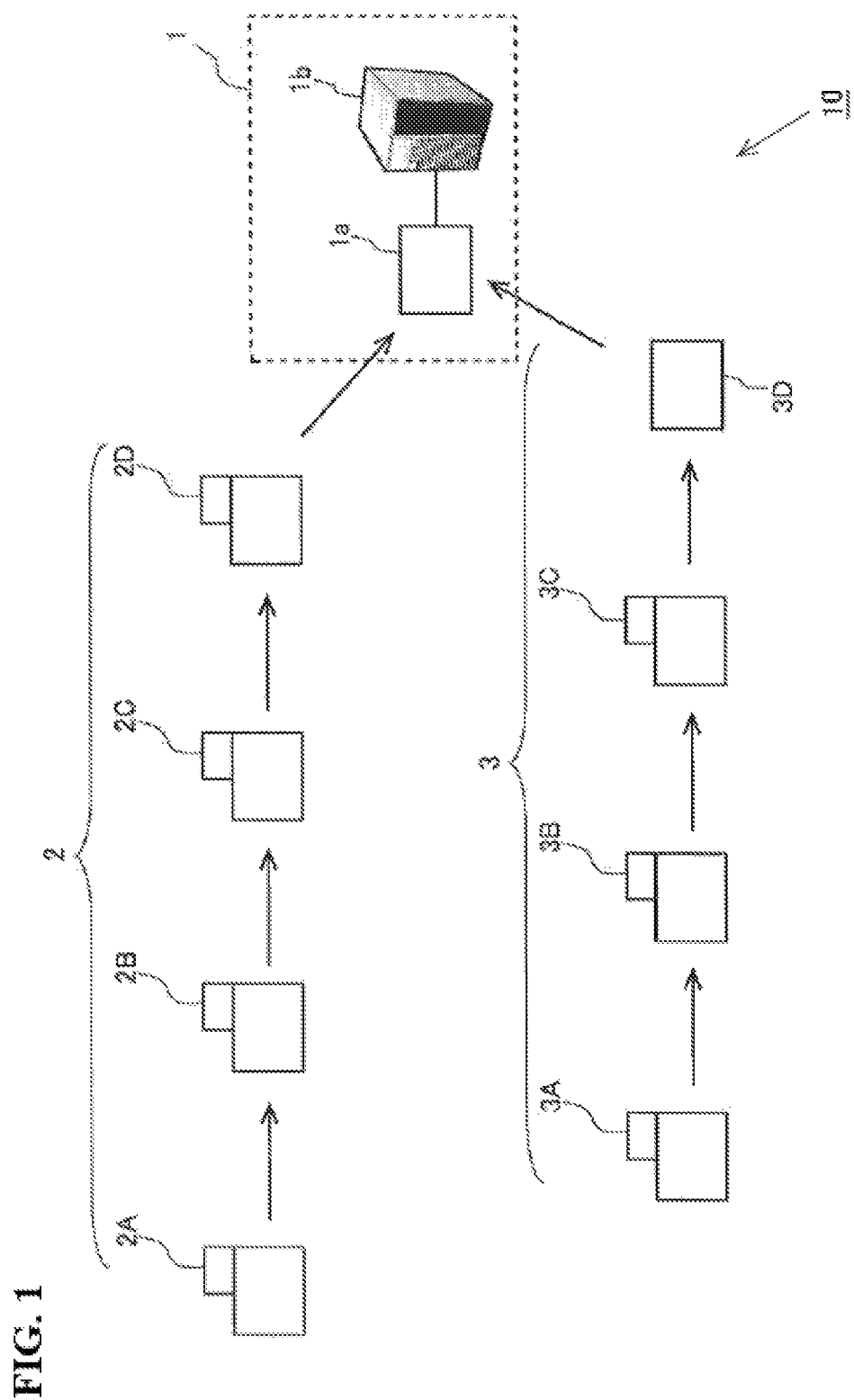
FIG. 1 is a diagram showing a schematic configuration of a network system according to an embodiment of the present invention.

FIG. 1 is a diagram showing a schematic configuration of the system 10. In the system 10, two transmission paths are formed between an information processing apparatus 1 and transmission modules that are equipped with sensors for measuring various external environment parameters (e.g., a temperature, humidity, and acceleration). Note that transmission modules that are on one transmission path are given the same reference numeral. Furthermore, in passages where each of a plurality of transmission modules that are on one transmission path is described distinctively, the reference numerals 2, 3 of the transmission modules are followed by a character ("A," "B," "C," "D") for individual identification.

Specifically, a transmission path on which a plurality of transmission modules 2 are present, as well as a transmission path on which a plurality of transmission modules 3 are present, is formed in the system 10. Transmission modules 2A to 2D that are equipped with the aforementioned sensors are on the former transmission path. Transmission modules 3A to 3D that are equipped with the aforementioned sensors, as well as a transmission module 3D that is not equipped with a sensor and only has a relay function, are on the latter transmission path. Note that in the system 10 shown in FIG. 1, the transmission modules perform wireless communication with one another, and the order of relay performed by the transmission modules on each transmission path is determined in advance. Therefore, for example, on the transmission path with the transmission modules 2, measurement data of the sensors of the transmission modules is sequentially added and transferred in order of the transmission modules 2A, 2B, 2C, and 2D, and the transmission module 2C transmits the final data to a destination of this path, i.e., the information processing apparatus 1. On the other hand, on the transmission path with the transmission modules 3, measurement data of the sensors of the transmission modules is sequentially added and transmitted in order of the transmission modules 3A, 3B, and 3C, and the transmission module 3D relays the final measurement data sent from the transmission module 3C to a destination of this path, i.e., the information processing apparatus 1. Note that according to the present embodiment, measurement data of the sensor of each transmission module is equivalent to send target information according to the present invention.

Furthermore, send information according to the present embodiment is a collective term for information that is transmitted to the information processing apparatus 1 along each transmission path, and this send information includes measurement data of the sensor of each transmission module, i.e., send target information.

The information processing apparatus 1 includes a sending/receiving apparatus 1a and a server 1b. The sending/receiving apparatus 1a receives information transmitted from the transmission modules 2D, 3D that are nearest to the information processing apparatus 1 on their respective transmission paths. In order to deliver a predetermined operational command to the transmission modules that form the transmission paths, the sending/receiving apparatus 1a also functions as an apparatus for sending the operational command to the transmission modules 2D, 3D. Note that for the sake of convenience, the following description is based on the premise that the information processing apparatus 1 is the destination of information transmitted on the transmission paths 2, 3. The sending/receiving apparatus 1a is electronically connected to the server 1b. For example, the server 1b collects information measured by the sensors of the transmission modules 2A to 2D and 3A to 3C, and executes predetermined information processing.

In order to achieve continuous information collection, the measurement performed by the sensors of the transmission modules 2A to 2D and 3A to 3C, as well as the transmission of the measurement data to the information processing apparatus 1, is repeated at a predetermined interval (e.g., at a regular interval) following power-on of the transmission modules. Among the transmission modules 2, 3 shown in FIG. 1, the sensor-equipped transmission modules are configured as small devices that have, for example, a sensor function of measuring a measurement target, a function of recording and processing measured information, a wireless function intended for the outside of the transmission modules, and a power source function. On the other hand, among the transmission modules 2, 3 shown in FIG. 1, the transmission module that is not equipped with a sensor is configured as a small device that has, for example, a wireless function intended for the outside of the transmission module and a power source function.

The sensors of the transmission modules 2, 3 may include, for example, physical sensors, such as temperature sensors, humidity sensors, acceleration sensors, illuminance sensors, flow sensors, pressure sensors, ground temperature sensors, and particle sensors, and chemical sensors, such as $CO_2$ sensors, pH sensors, EC sensors, and soil moisture sensors. According to the present embodiment, for the sake of simplicity, it is assumed that the transmission modules 2, 3 are equipped with temperature sensors for measuring an external temperature at their respective locations. It is also assumed that temperature data measured by the sensors of the transmission modules 2A to 2D, 3A to 3C is transmitted to the information processing apparatus 1 and used for the predetermined information processing by the server 1b.

On each transmission path in the system 10, a sensor-equipped transmission module receives send information sent from an immediately upstream transmission module, generates new send information by including temperature data measured in itself, or the own transmission module, into the received send information, and sends the new send information to an immediately downstream transmission module.

Figure 2:
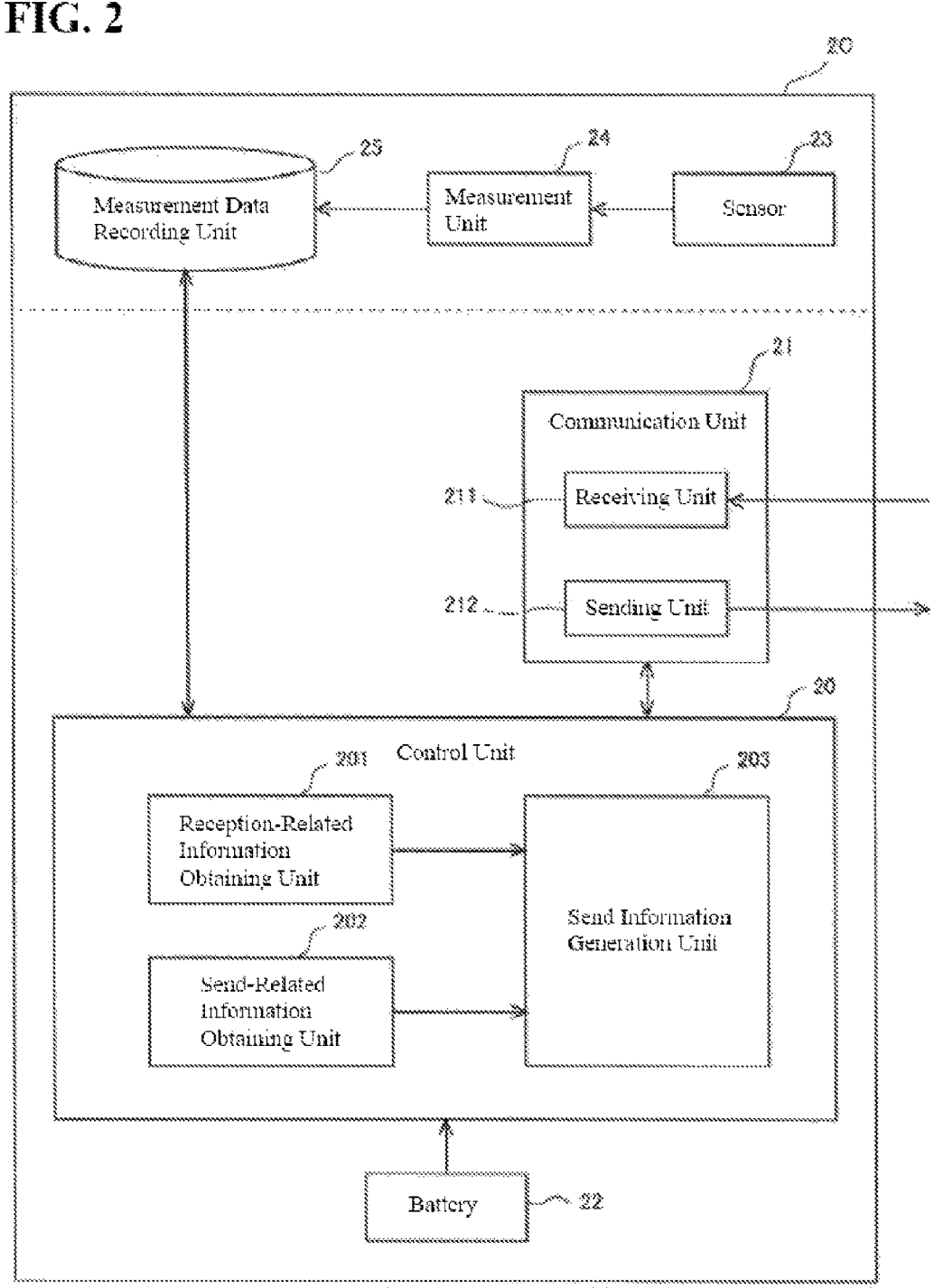
FIG. 2 is a functional block diagram of a transmission module included in the network system shown in FIG. 1.

A description is now given of specific processing executed by the transmission modules 2, 3 and the information processing apparatus 1 in the system 10. Calculation apparatuses, memories, and the like are included within the transmission modules 2, 3. The transmission modules 2, 3 exert various functions by the calculation apparatuses executing predetermined control programs. FIG. 2 shows functional blocks representing a part of various functions exerted by the transmission modules 2 that belong to the system 10. Although FIG. 2 specifically shows functional blocks pertaining to the sensor-equipped transmission module 2C, other sensor-equipped transmission modules 2A, 2B, 2D, 3A, 3B, 3C also have functions similar to the functions of the transmission module 2C. On the other hand, the transmission module 3D that is not equipped with a sensor is configured to include a functional unit that relays send information.

The transmission module 2C includes a control unit 20, a communication unit 21, a battery 22, a measurement unit 24, and a measurement data recording unit 25 as functional units, in addition to a temperature sensor 23. The functional units included in the transmission module 2C will now be described.

The communication unit 21 is a functional unit that communicates with the outside of the transmission module 2C, that is to say, sends/receives information. The communication unit 21 includes a receiving unit 211 and a sending unit 212. The receiving unit 211 is a functional unit that, when the transmission module 2C serves as the own transmission module, receives information sent from an immediately upstream transmission module, i.e., the transmission module 2B. The sending unit 212 is a functional unit that, when the transmission module 2C serves as the own transmission module, sends information to an immediately downstream transmission module, i.e., the transmission module 2D.

The control unit 20 is a functional unit that is in charge of various types of control in the transmission module 2C. The control unit 20 includes a reception-related information obtaining unit 201, a send-related information obtaining unit 202, and a send information generation unit 203. The reception-related information obtaining unit 201 is a functional unit that obtains reception-related information at the time of reception of information by the receiving unit 211. The reception-related information is information related to the reception of information by the receiving unit 211. Specifically, the reception-related information refers to information that includes receiving time information corresponding to the time of reception of information by the receiving unit 211, and received signal strength information corresponding to received signal strength at the time of reception of information by the receiving unit 211. The send-related information obtaining unit 202 is a functional unit that obtains send-related information at the time of sending of information from the sending unit 212. The send-related information is information related to sending of information from the sending unit 212. Specifically, the send-related information refers to information that includes sending time information corresponding to the time of sending of information from the sending unit 212, and sending power information corresponding to sending power at the time of sending of information from the sending unit 212. In the transmission module 2C, the send information generation unit 203 is a functional unit that forms new send information by including the temperature data measured by the temperature sensor 23, the reception-related information obtained by the reception-related information obtaining unit 201, and the send-related information obtained by the send-related information obtaining unit 202 into send information received from the immediately upstream transmission module, i.e., the transmission module 2B. The battery 22 functions as a power source that supplies power for driving the functions of the transmission module 2C.

The measurement unit 24 is a functional unit that measures, via the temperature sensor 23, the temperature of the environment in which the transmission module 2C is located. The measurement unit 24 measures the temperature under an instruction from the control unit 20. The measured temperature data is recorded to the measurement data recording unit 25 as needed. The measurement data recording unit 25 is formed to interact with the control unit 20, and provides the recorded measurement data (temperature data) to the control unit 20 in accordance with an instruction from the control unit 20. Then, the provided temperature data is used by the generation unit 203 in processing for generating send information.

Figure 3:
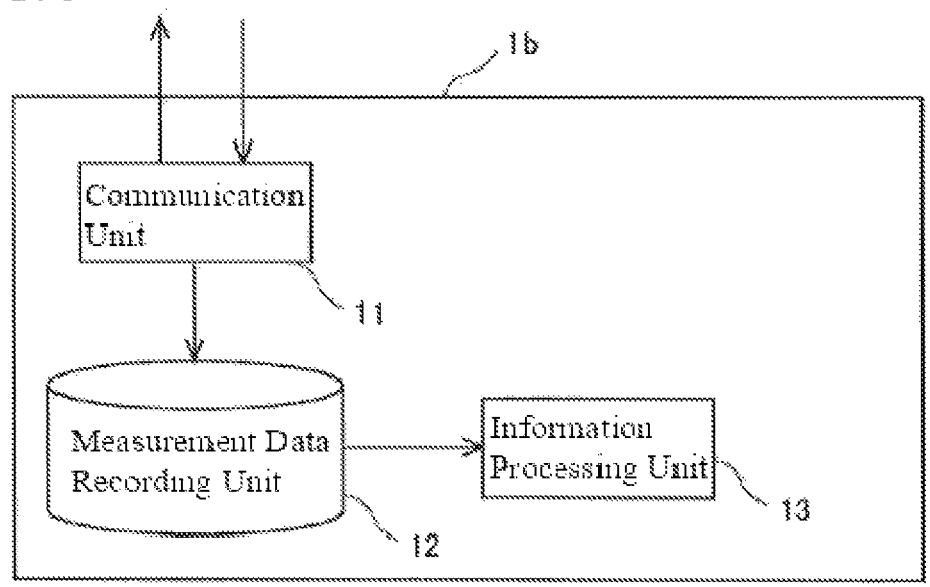
FIG. 3 is a functional block diagram of a server included in the network system shown in FIG. 1.

Functional units formed in the server 1*b* will now be described based on FIG. 3. The server 1*b* includes a communication unit 11, a measurement data recording unit 12, and an information processing unit 13. The communication unit 11 is a functional unit that performs communication to collect send information from the transmission modules that are nearest to the information processing apparatus 1 on their respective transmission paths via the sending/receiving apparatus 1*a*. Specifically, the communication unit 11 is in charge of sending/receiving between the information processing apparatus 1 and the transmission modules 2D, 3D. The measurement data recording unit 12 is a functional unit that records temperature data, which is measurement data in information included in send information transmitted from the transmission modules 2D, 3D. The recorded temperature data is provided to the information processing unit 13, and the information processing unit 13 executes predetermined information processing (e.g., processing for air conditioning in the space where the transmission modules are located) using the collected temperature data. In view of this, the sensors of the transmission modules are not limited to the aforementioned temperature sensors, and may be any sensors for measuring information that is necessary for the predetermined information processing to be executed by the information processing unit 13.

Information Transmission Processing

Figure 4:
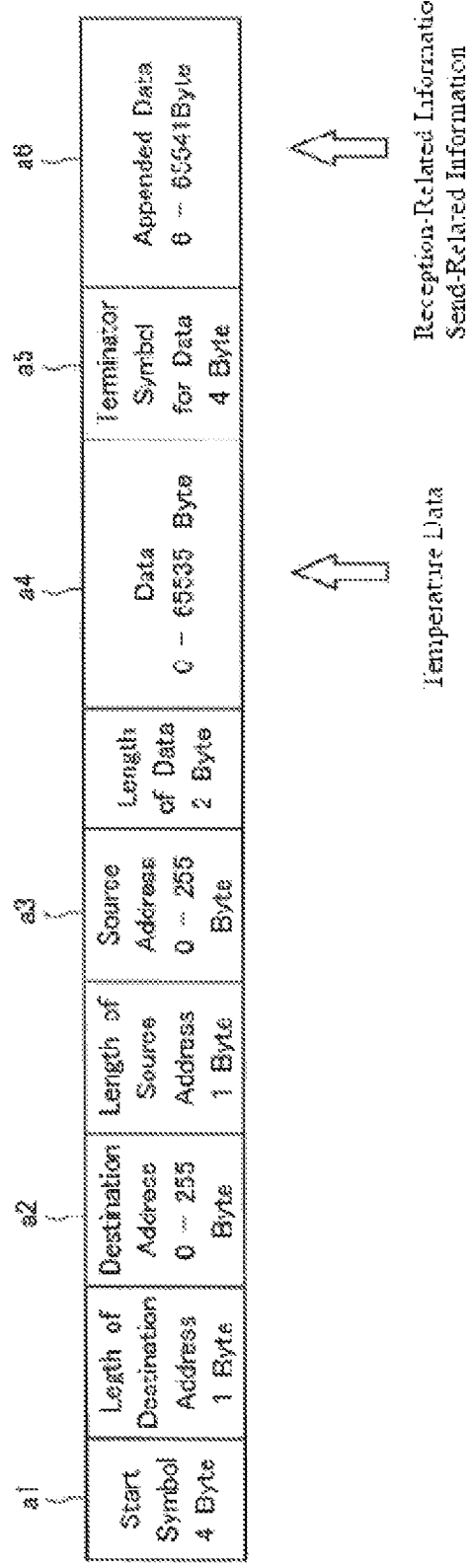
FIG. 4 is a diagram schematically showing a data structure of an entirety of send information that is transmitted on each transmission path in the network system shown in FIG. 1.
Figure 5:
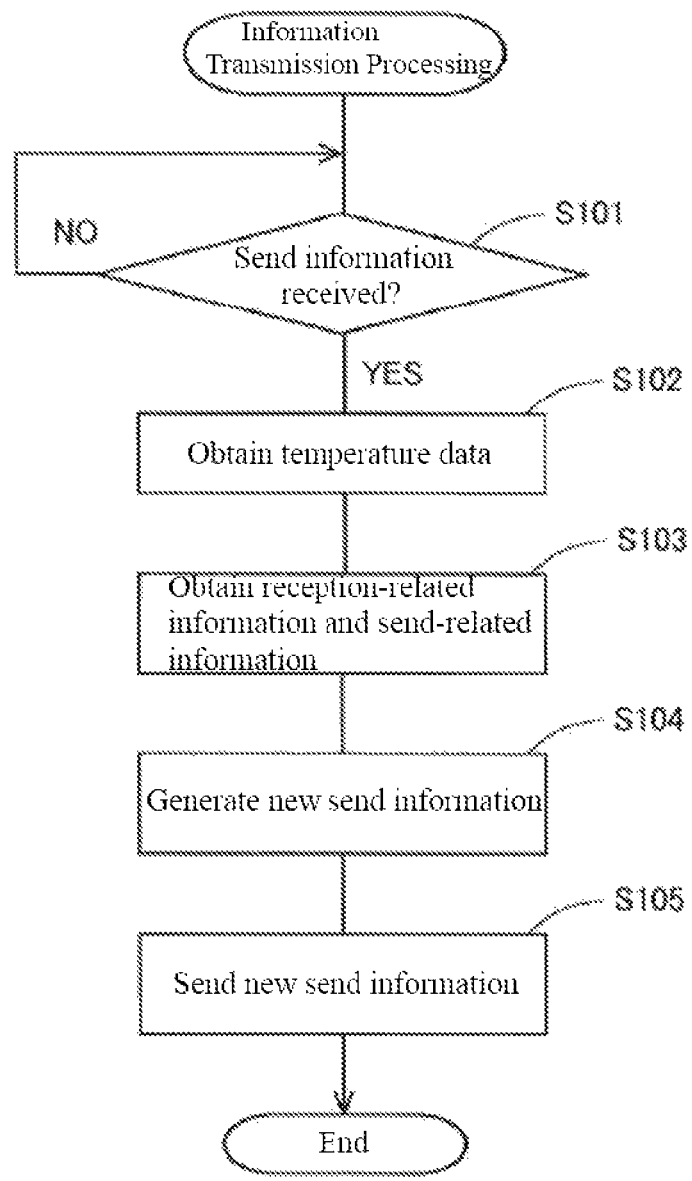
FIG. 5 is a flowchart of information transmission processing for send information executed by the transmission module shown in FIG. 2.

Based on FIGS. 4 to 6, a description is now given of information transmission processing executed by the transmission modules in the system 10. FIG. 4 is a diagram schematically showing a data structure of an entirety of send information that is transmitted on each transmission path in the system 10. As shown in FIG. 4, this send information is roughly divided into nine data areas. In the present embodiment, six data areas a1 to a6, which are particularly important among the nine data areas, will be described. The area a1 (Start Symbol) is a specific byte string indicating the start of the send information. The area a2 (Destination Address) indicates the address of a final transmission destination of the send information (in the present embodiment, the information processing apparatus 1). The area a3 (Source Address) indicates the address of a sending source of the send information (the transmission module 2A on the transmission path 2, and the transmission module 3A on the transmission path 3). The area a4 (Data) stores temperature data (measurement data) measured by the temperature sensor of each transmission module. The area a5 (Terminator Symbol for Data) is a specific byte string indicating the end of the send information. The area a6 (Appended Data) stores reception-related information (receiving time information and received signal strength information) and send-related information (sending time information and sending power information) in each transmission module.

FIG. 5 is a flowchart of the information transmission processing executed by the transmission modules. Although this information transmission processing is executed by the transmission modules 2, 3 that respectively belong to the two transmission paths shown in FIG. 1, the following describes the information transmission processing pertaining to the transmission module 2C as a representative example. Therefore, in the following description, the transmission module 2C serves as a reference, that is to say, the own transmission module, and its relative positional relationships with other transmission modules on the transmission path 2 are specified. In this information transmission processing, first, whether the own transmission module 2C has received send information from the immediately upstream transmission module 2B is determined in S101. In order for this determination to be made, the control unit 20 accesses the communication unit 21. If the result of the determination in S101 is affirmative, the process of S102 is executed. If the result of the determination in S101 is negative, the process of S101 is executed again.

Next, in S102, temperature data measured by the temperature sensor 23 of the own transmission module 2C is obtained. To be more precise, temperature data recorded in the measurement data recording unit 25 is provided to the control unit 20. Next, in S103, reception-related information and send-related information in the own transmission module 2C are obtained. To be more precise, the reception-related information obtaining unit 201 obtains receiving time information and received signal strength information at the time of reception of the send information, which has been sent from the immediately upstream transmission module 2B, by the receiving unit 211 of the own transmission module 2C. Furthermore, the send-related information obtaining unit 202 obtains sending time information and sending power information at the time of sending of the send information from the sending unit 212 of the own transmission module 2C to the immediately downstream transmission module 2D.

Next, in S104, the send information obtaining unit 203 generates new send information to be sent from the own transmission module 2C to the immediately downstream transmission module 2D. To be more precise, the new temperature data obtained in S102 is additionally stored to the area a4 (Data) of the send information received from the immediately upstream transmission module 2B. Furthermore, the new reception-related information and send-related information obtained in S103 are additionally stored to the area a6 (Appended Data) of the send information received from the immediately upstream transmission module 2B. Next, in S105, the new send information that has been generated in the own transmission module 2C is sent to the immediately downstream transmission module 2D.

FIG. 6 is a diagram schematically showing data structures of information stored in the area a4 (Data) and the area a6 (Appended Data) of send information that is sent from and received by the own transmission module 2C at the time of execution of the information transmission processing illustrated in FIG. 5. FIG. 6(*a*) schematically shows a data structure of information stored in the area a4 (Data) and the area a6 (Appended Data) of send information that the own transmission module 2C has received from the immediately upstream transmission module 2B. On the other hand, FIG. 6(*b*) schematically shows a data structure of information stored in the area a4 (Data) and the area a6 (Appended Data) of send information that the own transmission module 2C has sent to the immediately downstream transmission module 2D.

In FIG. 6, Tempa, Tempb, and Tempc represent pieces of temperature data obtained in the upstream transmission module 2A, the immediately upstream transmission module 2B, and the own transmission module 2C, respectively, and trb and trc represent pieces of receiving time information obtained in the immediately upstream transmission module 2B and the own transmission module 2C, respectively. Srb and Src represent pieces of received signal strength information obtained in the immediately upstream transmission module 2B and the own transmission module 2C, respectively, and tsa, tsb, and tsc represent pieces of sending time information obtained in the upstream transmission module 2A, the immediately upstream transmission module 2B, and the own transmission module 2C, respectively. Ssa, Ssb, and Ssc represent pieces of sending power information obtained in the upstream transmission module 2A, the immediately upstream transmission module 2B, and the own transmission module 2C, respectively. Note that the upstream transmission module 2A does not receive any send information as it is located most upstream on the corresponding transmission path. Therefore, the area a6 of the send information does not store reception-related information in the upstream transmission module 2A. As shown in this FIG. 6, through the execution of the information transmission processing illustrated in FIG. 5, the own transmission module 2C appends the temperature data Tempc, receiving time information trc, received signal strength information Src, sending time information tsc, and sending power information Ssc that have been obtained in the own transmission module 2C to the received send information, and then sends the resultant send information. Accordingly, the receiving time information, received signal strength information, sending time information, and sending power information are transmitted together with the temperature data, i.e., send target information.

Note that a transmission module that is not equipped with a temperature sensor, such as the transmission module 3D, naturally does not measure temperature data. In the information transmission processing executed by such a transmission module, the obtainment of temperature data in S102 is skipped. Therefore, new temperature data is not stored to the area a4 of send information, and reception-related information and send-related information in this transmission module are additionally stored only to the area a6 of the send information.

Alternatively, when one piece of send information is transmitted along the transmission path 2, each of transmission modules serving as relays may not add temperature data measured in itself, and may add only reception-related information and send-related information, to this one piece of send information. In this case, the information processing apparatus 1 receives send information with the following data structure: the area a4 (Data) only stores temperature data measured in a transmission module serving as a transmission source, and the area a6 (Appended Data) stores, similarly to the above, pieces of reception-related information and pieces of send-related information in the transmission module serving as the transmission source and in the transmission modules serving as the relays. In the case of this data structure, for example, the structures schematically shown in FIG. 6 will be as follows. In both of FIGS. 6(a) and 6(b), the area a4 (Data) stores only temperature data Tempa measured in the transmission module 2A, and the area a6 (Appended Data) stores, similarly to FIGS. 6(a) and 6(b) as presented, pieces of reception-related information and pieces of send-related information in the transmission modules. When send information has such a data structure, each of transmission modules serving as relay modules acts as a transmission source, thereby transmitting send information including temperature data measured in itself. Accordingly, the information processing apparatus 1 collects pieces of temperature data measured in the transmission modules on the transmission path.

Communication Status Output Apparatus

Based on FIGS. 7 to 10, the communication status output apparatus 4 according to the present embodiment will now be described. The communication status output apparatus 4 is used to grasp the communication status on each of the transmission paths 2, 3 in the system 10 shown in FIG. 1. Specifically, the communication status output apparatus 4 is connected to an arbitrary transmission module on a transmission path whose communication status is to be output, and outputs the status of communication between the arbitrary transmission module and a transmission module that is located upstream of the arbitrary transmission module on this transmission path. In the following description, it is assumed that the communication status of the transmission modules 2B, 2C on the transmission path 2 in the system 10 shown in FIG. 1 is to be output.

Figure 7:
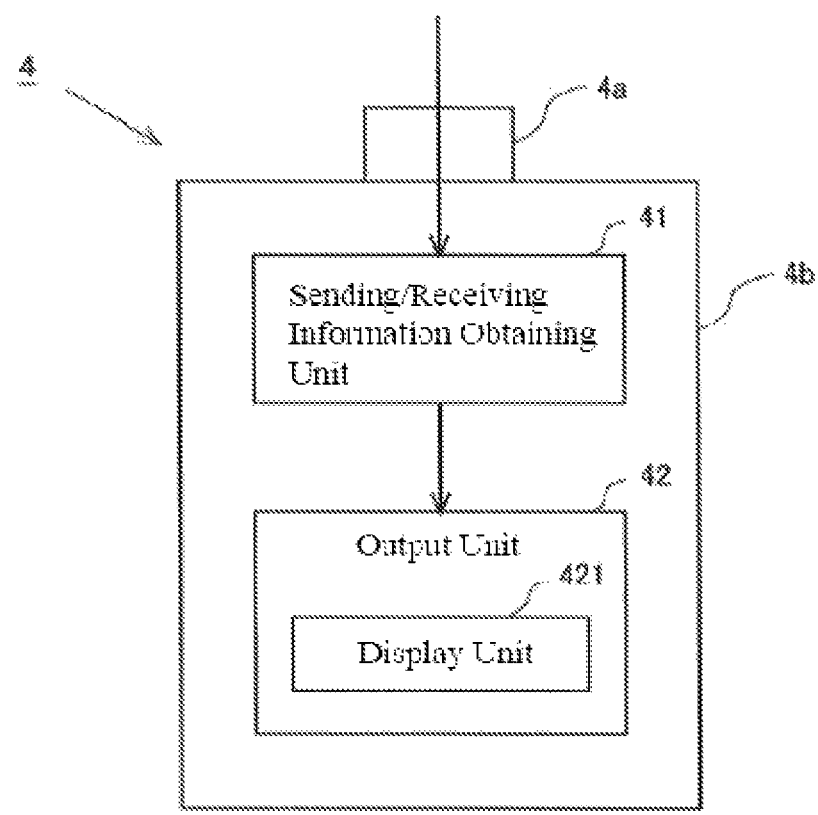
FIG. 7 is a diagram showing a schematic configuration of a communication status output apparatus according to the embodiment of the present invention.

FIG. 7 is a diagram showing a schematic configuration of the communication status output apparatus 4. The communication status output apparatus 4 includes a connection unit 4a and an output apparatus body 4b. The connection unit 4a is connected to a transmission module whose communication status is to be output. The connection unit 4a is connected to, out of two transmission modules whose communication status is to be output, one transmission module (here, the transmission module 2C) that is located downstream relative to the other. Connection between the connection unit 4a and the transmission module 2C enables communication between the transmission module 2C and the output apparatus body 4b. Note that no particular restriction is intended regarding the form of connection between the connection unit 4a and the transmission module 2C. The connection may be in a wired form or a wireless form as long as the transmission module 2C and the output apparatus body 4b can communicate with each other.

The output apparatus body 4b includes a sending/receiving information obtaining unit 41 and an output unit 42. The sending/receiving information obtaining unit 41 is a functional unit that obtains information corresponding to each parameter indicating the status of communication between the transmission modules 2B and 2C from the transmission module 2C via the connection unit 4a. The information obtained by the sending/receiving information obtaining unit 41 will be described later. The output unit 42 is a functional unit that outputs the status of communication between the transmission modules 2B and 2C on the basis of the information obtained by the sending/receiving information obtaining unit 41. The output unit 42 includes a display unit 421, and displays the status of communication between the transmission modules 2B and 2C as an image on the display unit 421. The form of the image displayed on the display unit 421 will be described later.

Parameters indicating the status of communication between the transmission modules 2B and 2C include sending power at the time of sending of send information shown in FIG. 4 including temperature data, i.e., send target information, from the transmission module 2B, received signal strength at the time of reception of the send information by the transmission module 2C, and a transmission period between sending of the send information from the transmission module 2B and reception of the send information by the transmission module 2C. Thus, the sending/receiving information obtaining unit 41 obtains the following as information corresponding to these parameters from the transmission module 2C: sending power information and sending time information at the time of sending of the send information from the transmission module 2B, and received signal strength information and receiving time information at the time of reception of the send information by the transmission module 2C. Note that the transmission period of the send information from the transmission module 2B to the transmission module 2C can be calculated from a difference between the time of sending from the transmission module 2B and the time of reception by the transmission module 2C. In view of this, the sending/receiving information obtaining unit 41 obtains transmission period information corresponding to the transmission period between sending of the send information from the transmission module 2B and reception of the send information by the transmission module 2C on the basis of the sending time information at the time of sending of the send information from the transmission module 2B and the receiving time information at the time of reception of the send information by the transmission module 2C.

As shown in FIG. 6(a), the send information that the transmission module 2C receives from the transmission module 2B includes the sending time information tsb and the sending power information Ssb in the transmission module 2B. Therefore, the sending power information and the sending time information at the time of sending of the send information from the transmission module 2B can be obtained from the transmission module 2C that is located downstream of the transmission module 2B. Furthermore, in the transmission module 2C, the reception-related information obtaining unit 201 of itself obtains the received signal strength information and the receiving time information at the time of reception of the send information by the transmission module 2C. Therefore, the received signal strength information and the receiving time information at the time of reception of the send information by the transmission module 2C can be obtained from the transmission module 2C.

Form of Display of Communication Status

Figure 8:
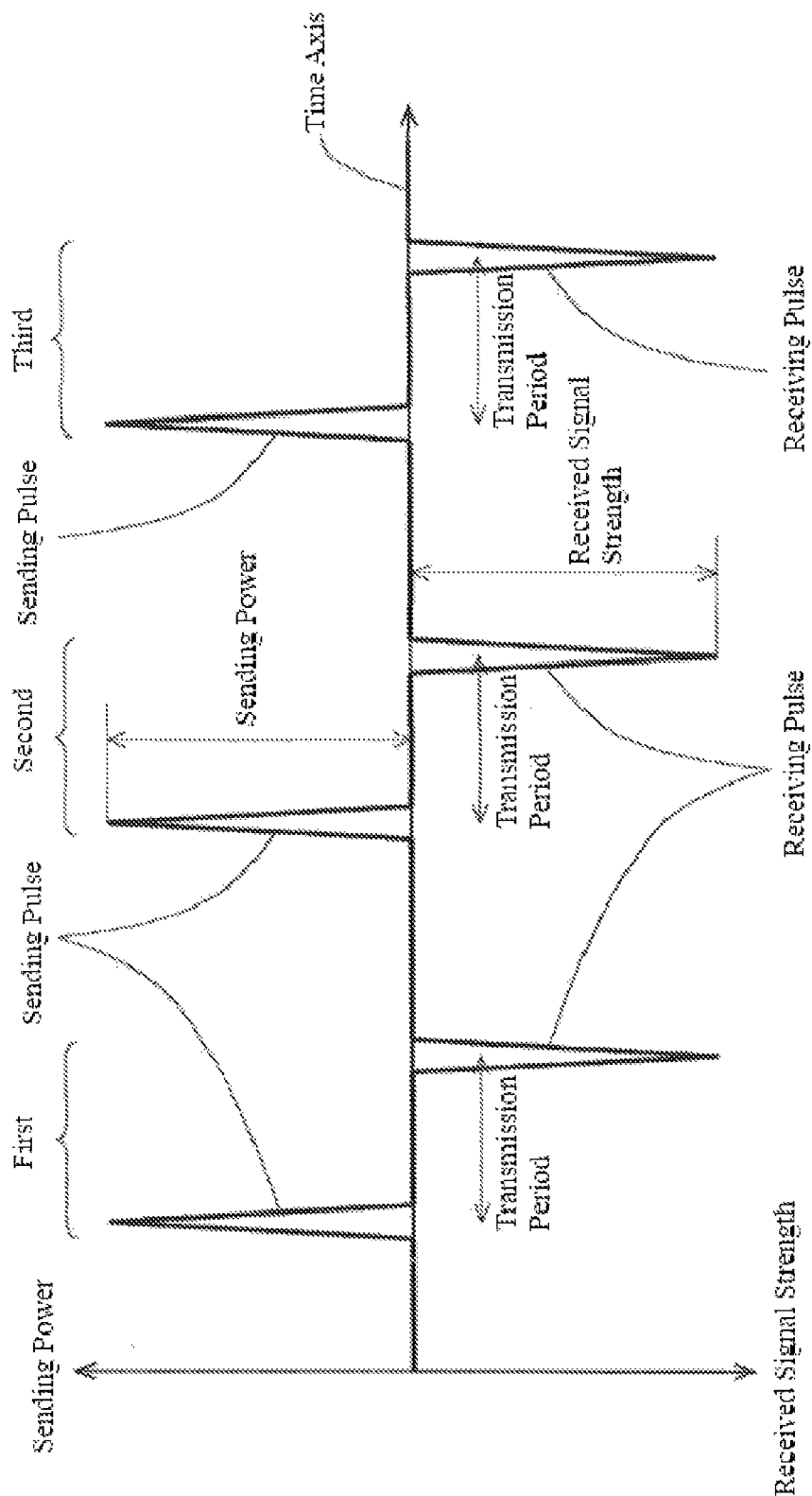
FIG. 8 is a diagram showing an image that is displayed on a display unit included in an output unit of the communication status output apparatus shown in FIG. 7.
Figure 9:
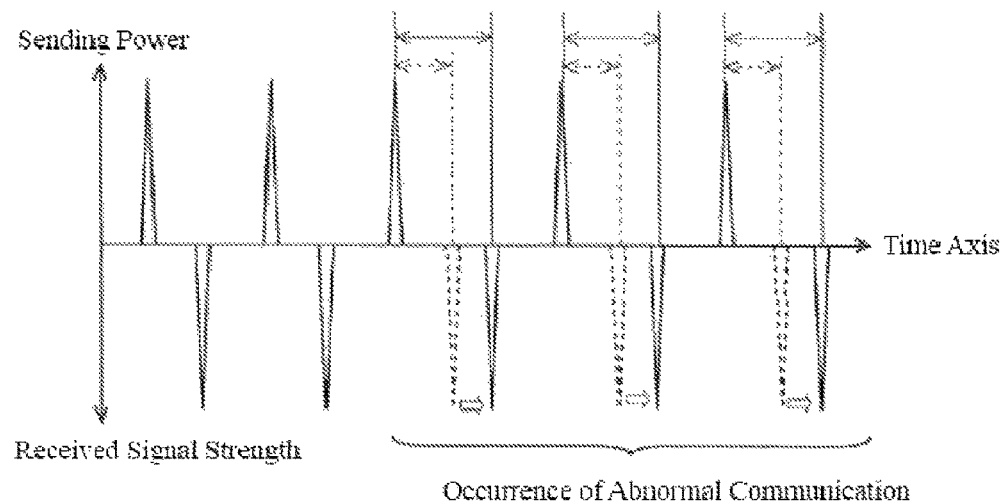
FIG. 9 is a diagram showing examples of an image that is displayed on the display unit included in the output unit of the communication status output apparatus shown in FIG. 7 when an abnormality has occurred in the status of communication between transmission modules.

The display unit 421 included in the output unit 42 displays an image such as that shown in FIG. 8 as an image presenting the status of communication between the transmission modules 2B and 2C. This image presents a time axis indicating the passage of time as a horizontal axis. This image also presents sending power information at the time of sending of send information from the transmission module 2B (or simply "sending power information" hereinafter) as a sending pulse that projects upward with respect to the time axis as shown in FIG. 8. The magnitude of this sending pulse corresponds to the magnitude of sending power at the time of sending of the send information from the transmission module 2B (or simply "sending power" hereinafter). This image also presents received signal strength information at the time of reception of the send information by the transmission module 2C (or simply "received signal strength information" hereinafter) as a receiving pulse that projects downward with respect to the time axis as shown in FIG. 8. The magnitude of this receiving pulse corresponds to the magnitude of received signal strength at the time of reception of the send information by the transmission module 2C (or simply "received signal strength" hereinafter).

As stated earlier, send information is transmitted repeatedly at the predetermined interval on the transmission path 2. Herein, sending power information and received signal strength information associated with one piece of send information are together referred to as pieces of sending/receiving information. The image shown in FIG. 8 presents a sending pulse and a receiving pulse associated with one piece of send information as one pair of sending/receiving pulses. That is to say, sending power information and received signal strength information associated with one piece of send information are presented as one pair of pieces of sending/receiving information. The sending/receiving pulses associated with each piece of send information are presented in such a manner that they are lined up along the time axis in order of transmission on the transmission path 2. Note that in FIG. 8, "first" is appended to sending/receiving pulses associated with send information that has been transmitted for the first time, "second" is appended to sending/receiving pulses associated with send information that has been transmitted for the second time, and "third" is appended to sending/receiving pulses associated with send information that has been transmitted for the third time, on the transmission path 2 since the display unit 421 started the display of sending/receiving pulses (i.e., since the output of the status of communication between the transmission modules 2B and 2C was started). Furthermore, the image shown in FIG. 8 presents sending/receiving pulses in such a manner that an interval between a sending pulse and a receiving pulse composing one pair of sending/receiving pulses associated with one piece of send information corresponds to a transmission period between sending of this one piece of send information from the transmission module 2B and reception of this one piece of send information by the transmission module 2C.

The image shown in FIG. 8 pertains to a case in which the status of communication between the transmission modules 2B and 2C is normal. Based on FIG. 9, a description is now given of examples of an image that is displayed on the display unit 421 when an abnormality has occurred in communication between the transmission modules 2B and 2C for some reason. In images shown in FIGS. 9(a) and 9(b), solid lines indicate the occurrence of abnormal communication, and dash lines indicate normal communication. For example, in FIG. 9(a), although sending pulses are constant in magnitude, receiving pulses decrease in magnitude during the display of sending/receiving pulses. In this case, it can be determined that an abnormality associated with a decrease in received signal strength in the transmission module 2C has occurred between the transmission modules 2B and 2C. On the other hand, in FIG. 9(b), an interval between a sending pulse and a receiving pulse composing one pair of sending/receiving pulses increases during the display of sending/receiving pulses. In this case, it can be determined that an abnormality associated with a prolonged period of delivery of send information has occurred between the transmission modules 2B and the 2C.

Figure 10:
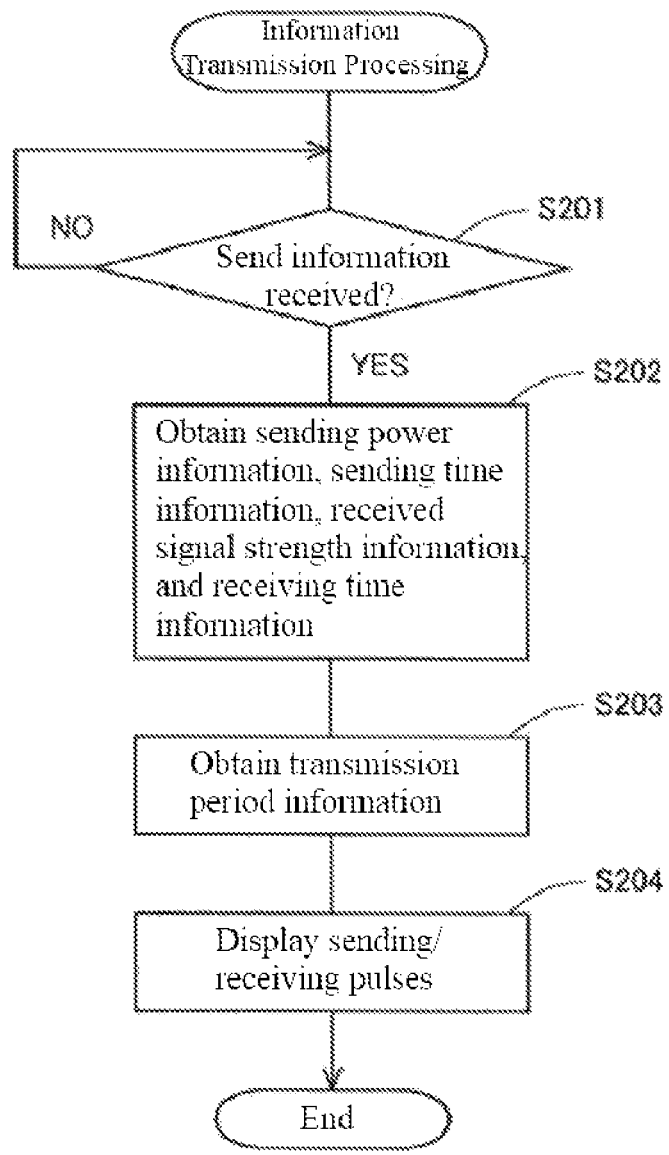
FIG. 10 is a flowchart of communication status output processing executed by the communication status output apparatus shown in FIG. 7.

Communication status output processing in the communication status output apparatus 4 will now be described. FIG. 10 is a flowchart of the communication status output processing in the communication status output apparatus 4. In the communication status output processing, first, whether the transmission module 2C has received send information from the transmission module 2B is determined in S201. In order for this determination to be made, the sending/receiving information obtaining unit 41 accesses the control unit 20 of the transmission module 2C via the connection unit 4a. If the result of the determination in S201 is affirmative, the process of S202 is executed. If the result of the determination in S201 is negative, the process of S201 is executed again.

In S202, sending power information, sending time information, received signal strength information, and receiving time information associated with the send information that has just been received by the transmission module 2C are obtained from the transmission module 2C. Next, in S203, transmission period information is obtained on the basis of the sending time information and the receiving time information obtained in S202. Next, in S204, sending/receiving pulses associated with the send information that has just been received by the transmission module 2C are displayed on the display unit 421 on the basis of the sending power information and the received signal strength information obtained in S202 and the transmission period information obtained in S203.

As described above, according to the present embodiment, a user can perceive the magnitude of sending power, the magnitude of received signal strength, and a transmission period for every single piece of send information on the basis of the magnitude of a sending pulse, the magnitude of a receiving pulse, and a display interval between a sending pulse and a receiving pulse composing one pair of sending/receiving pulses on an image displayed on the display unit 421 included in the output unit 42 of the communication status output apparatus 4. Furthermore, the transmission module 2B is located immediately upstream of the transmission module 2C. That is to say, send information sent from the transmission module 2B is received directly by the transmission module 2C without making a stop at another transmission module. Therefore, the ratio between the magnitudes of a sending pulse and a receiving pulse composing one pair of sending/receiving pulses corresponds to the ratio between the magnitude of sending power at the time of sending of send information from the transmission module 2B and the magnitude of received signal strength at the time of reception of the send information by the transmission module 2C (that is to say, a signal attenuation rate). Accordingly, the user can also perceive such a signal attenuation rate from the aforementioned image. As such, the present embodiment enables the user to perceive each parameter indicating the status of communication between the transmission modules 2B and 2C, and thus makes it easy to grasp the status of communication between these transmission modules for every single piece of send information.

As described above, the display unit 421 included in the output unit 42 according to the present embodiment displays sending/receiving pulses that indicate pieces of sending/receiving information for every single piece of send information in such a manner that they are lined up along the time axis in order of transmission of each piece of send information on the transmission path 2. This enables the user to easily grasp a temporal change in the status of communication between the transmission module 2B and the transmission module 2C. Furthermore, the display unit 421 displays a sending pulse and a receiving pulse as pulses that project in opposite directions from each other with respect to the time axis. This makes it easy for the user to view a sending pulse and a receiving pulse for every single piece of send information.

Note that the form of display of pieces of sending/receiving information on the display unit 421 shown in FIG. 8 merely serves as an example, and the form of display of pieces of sending/receiving information according to the invention of the present application is not limited to this. For example, when pieces of sending/receiving information are displayed in the form of pulses as in the foregoing embodiment, the display unit 421 may display both of a sending pulse and a receiving pulse as pulses that project in the same direction with respect to the time axis and that have different colors from each other. Furthermore, a sending pulse and a receiving pulse may be separately displayed in an upper row and a lower row, respectively.

MODIFICATION EXAMPLE 1

In the foregoing embodiment, the status of communication between the transmission module 2C and the transmission module 2B, which is located immediately upstream of the transmission module 2C, on the transmission path 2 in the system 10 shown in FIG. 1 is to be output. The communication status output apparatus 4 according to the present embodiment can also output the status of communication between two transmission modules that are located with another transmission module interposed therebetween. For example, the status of communication between the transmission module 2C and the transmission module 2A, which is located upstream of the transmission module 2B, on the transmission path 2 in the system 10 shown in FIG. 1 can be output. In this case as well, the communication status output apparatus 4 is connected to the transmission module 2C. The sending/receiving information obtaining unit 41 of the communication status output apparatus 4 obtains, from the transmission module 2C, sending power information and sending time information at the time of sending of send information from the transmission module 2A. As shown in FIG. 6(a), send information that the transmission module 2C receives from the transmission module 2B includes not only sending time information tsb and sending power information Ssb in the transmission module 2B, but also sending time information tsa and sending power information Ssa in the transmission module 2A. Therefore, sending power information and sending time information at the time of sending of send information from the transmission module 2A can be obtained from the transmission module 2C.

When the status of communication between the transmission modules 2A and 2C is to be output, an image displayed on the display unit 421 included in the output unit 42 is similar to the image that is displayed when the status of communication between the transmission modules 2B and 2C is to be output in the foregoing embodiment. Note that send information received by the transmission module 2C is sent from the transmission module 2B that is located immediately upstream of the transmission module 2C. Therefore, a correlation (ratio) between the magnitude of sending power at the time of sending of send information from the transmission module 2A and the magnitude of received signal strength at the time of reception of send information by the transmission module 2C cannot serve as a parameter indicating the status of communication between the transmission modules 2A and 2C. That is to say, the communication status can be grasped from the magnitudes of sending pulses and receiving pulses per se presented by an image displayed on the display unit 421, but cannot be grasped from a correlation (ratio) between the magnitudes of a sending pulse and a receiving pulse composing one pair of sending/receiving pulses on the image. Therefore, in this case, the status of communication between transmission modules may be grasped on the basis of a correlation (ratio) between the total (or average) sending power and the total (or average) received signal strength in all of two transmission modules whose communication status is to be output (in Modification Example 1, the transmission modules 2A, 2C) and transmission modules interposed therebetween (in Modification Example 1, the transmission module 2B).

MODIFICATION EXAMPLE 2

In the foregoing embodiment, a communication status can be grasped by connecting the communication status output apparatus 4 to a transmission module whose communication status is to be output. Alternatively, the following configuration may be adopted: transmission modules that form the network each have the functions of the sending/receiving information obtaining unit 41 and the output unit 42 of the communication status output apparatus 4 according to the foregoing embodiment. This configuration makes it possible to grasp the status of communication between the own transmission module and an arbitrary transmission module that is located upstream of the own transmission module, with regard to each transmission module on the transmission paths.

MODIFICATION EXAMPLE 3

In the foregoing embodiment, pieces of sending/receiving information in transmission modules whose communication status is to be output are output as an image displayed on the display unit 421 included in the output unit 42 of the communication status output apparatus 4. However, pieces of sending/receiving information are not limited to being output as an image. They may be output in a form that enables the user to perceive the magnitude of sending power, the magnitude of received signal strength, and the length of a transmission period on the basis of sending power information, received signal strength information, and an interval between output of the sending power information and output of the received signal strength information.

For example, the following configuration may be adopted: the display unit displays sending power information and received signal strength as light emitted by different light sources. In this case, the magnitude of sending power can be displayed as luminance of a light source for outputting the sending power information, and the magnitude of the received signal strength can be displayed as luminance of a light source for outputting received signal strength information. Furthermore, the length of a transmission period can be indicated by an interval between lighting of the light source for outputting the sending power information and lighting of the light source for outputting the received signal strength information.

Alternatively, for example, the following configuration can be adopted: the output unit includes a sound source that outputs sending power information and received signal strength as different types of sound. In this case, the magnitude of sending power can be output as a sound volume of sound corresponding to the sending power information, and the magnitude of the received signal strength can be output as a sound volume of sound corresponding to received signal strength information. Furthermore, the length of a transmission period can be indicated by an interval between output of the sound corresponding to the sending power information and output of the sound corresponding to the received signal strength information.

Embodiment 2

Based on FIGS. 11 to 14, a description is now given of another embodiment of information transmission processing executed by the transmission modules and communication status output processing executed by the communication status output apparatus. The following description mainly focuses on differences from the information transmission processing and the communication status output processing according to Embodiment 1. A description of similar parts will be omitted below as appropriate.

Figure 11:
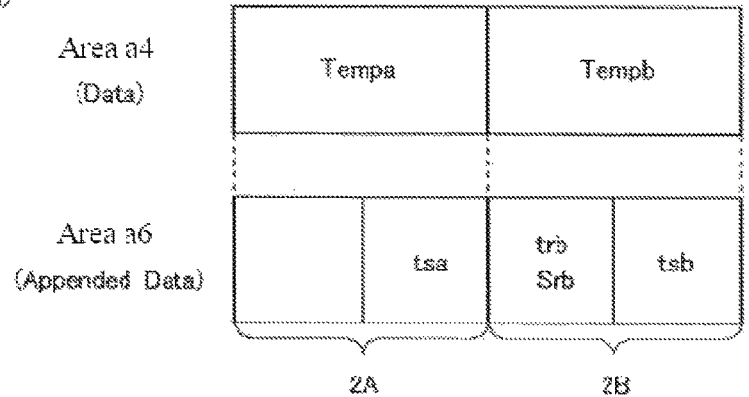
FIG. 11 is a second diagram schematically showing data structures of information stored in the area a4 (Data) and the area a6 (Appended Data) of send information that is sent from and received by the own transmission module at the time of execution of the information transmission processing.
Figure 11:
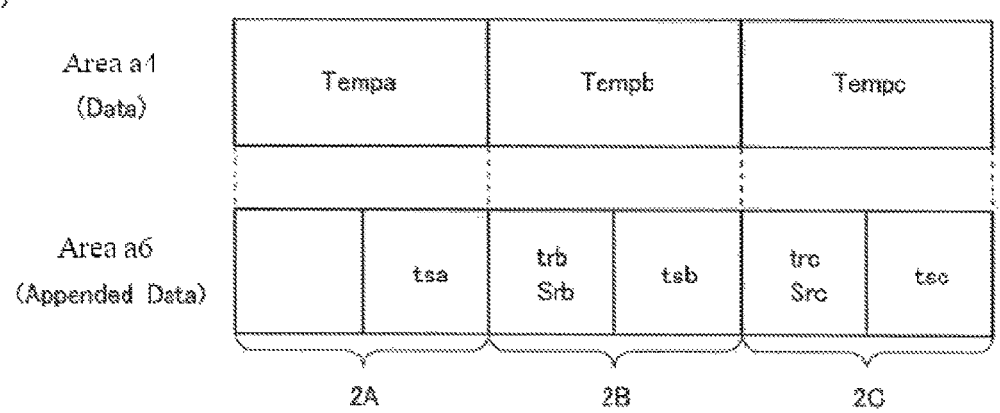

FIG. 11 is a diagram schematically showing data structures of information stored in the area a4 (Data) and the area a6 (Appended Data) of send information that is sent from and received by the own transmission module at the time of execution of the information transmission processing according to the present embodiment. FIG. 11(*a*) schematically shows a data structure of information stored in the area a4 (Data) and the area a6 (Appended Data) of send information that the own transmission module 2C has received from the immediately upstream transmission module 2B. On the other hand, FIG. 11(*b*) schematically shows a data structure of information stored in the area a4 (Data) and the area a6 (Appended Data) of send information that the own transmission module 2C has sent to the immediately downstream transmission module 2D.

As shown in FIG. 11, in the information transmission processing according to the present embodiment, the area a6 (Appended Data) stores only pieces of sending time information tsa, tsb, tsc as pieces of send-related information, and does not store sending power information. The information transmission processing according to the present embodiment differs from the information transmission processing according to Embodiment 1 in this regard. Note that in the information transmission processing according to the present embodiment as well, when one piece of send information is transmitted along the transmission path 2, each of transmission modules serving as relays may not add temperature data measured in itself, and may add only reception-related information and send-related information (sending time information), to this one piece of send information, similarly to Embodiment 1.

Figure 12:
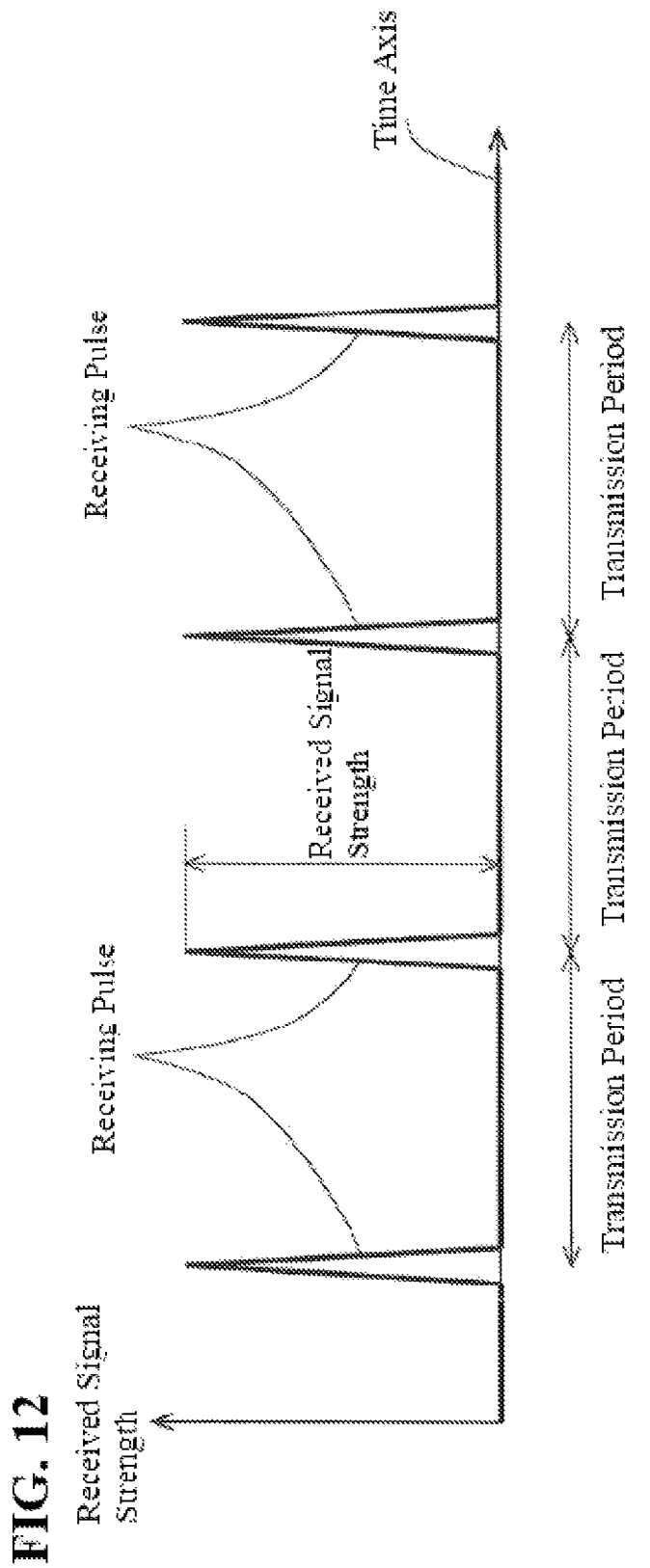
FIG. 12 is a second diagram showing an image that is displayed on the display unit included in the output unit of the communication status output apparatus shown in FIG. 7.
Figure 13:
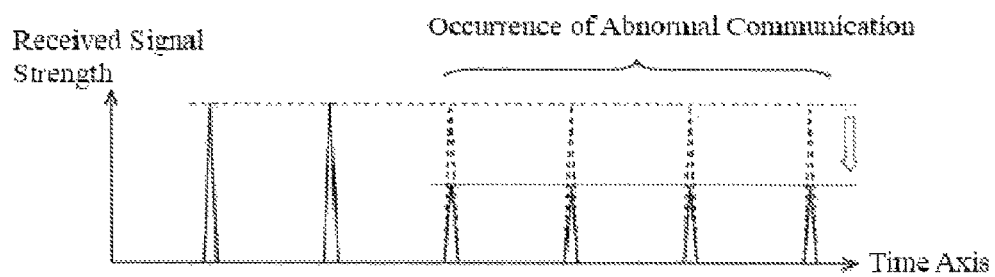
FIG. 13 is a second diagram showing examples of an image that is displayed on the display unit included in the output unit of the communication status output apparatus shown in FIG. 7 when an abnormality has occurred in the status of communication between transmission modules.
Figure 13:
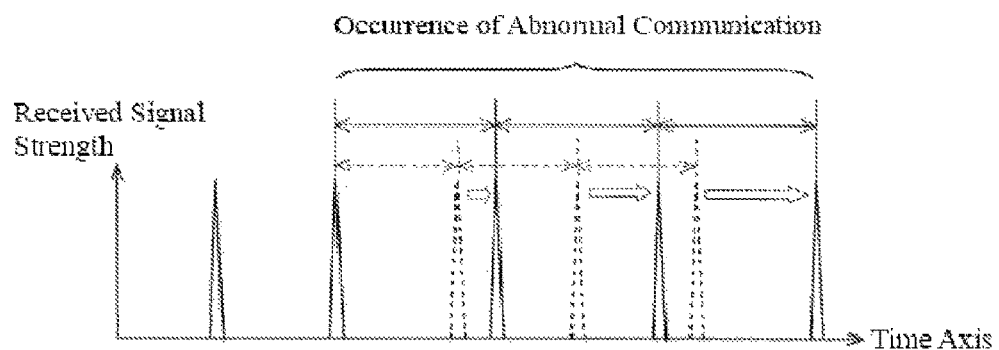

In outputting the status of communication between transmission modules, the communication status output apparatus according to the present embodiment only outputs received signal strength information, and does not output sending power information. FIG. 12 shows an image according to the present embodiment that is displayed on the display unit 421 included in the output unit 42 as an image indicating the status of communication between the transmission modules 2B and 2C on the transmission path 2 in the system 10 shown in FIG. 1. When the status of communication between the transmission modules 2B and 2C is to be output, the sending/receiving information obtaining unit 41 of the communication status output apparatus 4 obtains, from the transmission module 2C, sending time information at the time of sending of send information from the transmission module 2B, as well as received signal strength information and receiving time information at the time of reception of the send information by the transmission module 2C. That is to say, unlike Embodiment 1, the sending/receiving information obtaining unit 41 does not obtain sending power information at the time of sending of the send information from the transmission module 2B. Then, a receiving pulse indicating the received signal strength information is displayed on the display unit 421 as shown in FIG. 12. The magnitude of this receiving pulse corresponds to the magnitude of received signal strength at the time of reception of the send information by the transmission module 2C, similarly to the image shown in FIG. 8.

Furthermore, in FIG. 12, receiving pulses associated with pieces of send information are presented in such a manner that they are lined up along the time axis in order of transmission on the transmission path 2. At this time, the receiving pulses are presented in such a manner that an interval between a receiving pulse associated with one piece of send information and a receiving pulse associated with send information that was transmitted immediately before transmission of this one piece of send information (an interval between two adjacent receiving pulses) corresponds to a transmission period between sending of this one piece of send information from the transmission module 2B and reception of this one piece of send information by the transmission module 2C.

The image shown in FIG. 12 pertains to a case in which the status of communication between the transmission modules 2B and 2C is normal. Based on FIG. 13, a description is now given of examples of an image that is displayed on the display unit 421 when an abnormality has occurred in communication between the transmission modules 2B and 2C for some reason. In images shown in FIGS. 13(a) and 13(b), solid lines indicate the occurrence of abnormal communication, and dash lines indicate normal communication. For example, in FIG. 13(a), receiving pulses decrease in magnitude during the display of the receiving pulses. Unlike Embodiment 1, it is unclear whether the transmission module 2B is experiencing a change in sending power upon such a decrease in the present embodiment.

However, as sending power is generated in each transmission module, sending power is unsusceptible to an abnormality that has occurred between transmission modules. Therefore, when receiving pulses have changed in magnitude, the cause of the change is more likely to be a change in received signal strength (that is to say, a change in a signal attenuation rate) than to be a change in sending power. Therefore, when receiving pulses have changed as shown in FIG. 13(a), it can be determined that an abnormality associated with a decrease in received signal strength in the transmission module 2C has occurred between the transmission modules 2B and 2C. On the other hand, in FIG. 13(b), an interval between two adjacent receiving pulses increases during the display of receiving pulses. In this case, it can be determined that an abnormality associated with a prolonged period of delivery of send information has occurred between the transmission modules 2B and the 2C.

Figure 14:
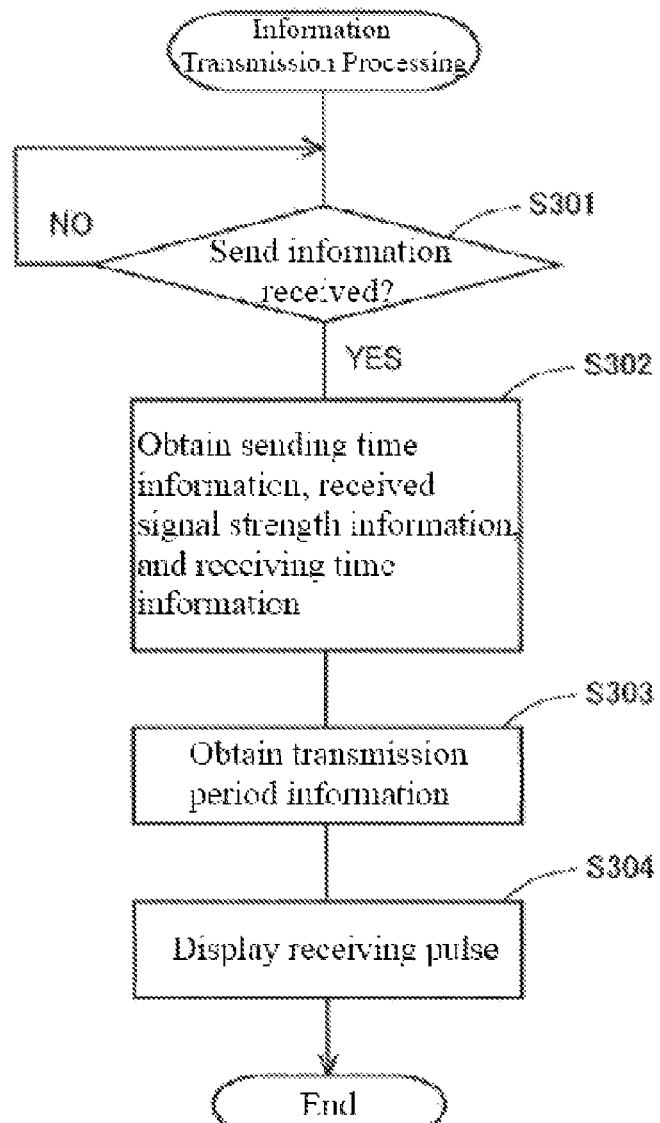
FIG. 14 is a second flowchart of the communication status output processing executed by the communication status output apparatus shown in FIG. 7.

A description is now given of the communication status output processing in the communication status output apparatus 4 according to the present embodiment. FIG. 14 is a flowchart of the communication status output processing in the communication status output apparatus 4. In the communication status output processing, first, whether the transmission module 2C has received send information from the transmission module 2B is determined in S301, similarly to S201 of the flowchart shown in FIG. 10. If the result of the determination in S301 is affirmative, the process of S302 is executed. If the result of the determination in S301 is negative, the process of S301 is executed again.

In S302, sending time information, received signal strength information, and receiving time information associated with the send information that has just been received by the transmission module 2C are obtained from the transmission module 2C. Next, in S303, transmission period information is obtained on the basis of the sending time information and the receiving time information obtained in S302. Next, in S304, the display unit 421 displays a receiving pulse associated with the send information that has just been received by the transmission module 2C on the basis of the received signal strength information obtained in S302 and the transmission period information obtained in S303.

As described above, according to the present embodiment, the user can perceive the magnitude of received signal strength and a transmission period for every single piece of send information on the basis of the magnitude of a receiving pulse and a display interval between two adjacent receiving pulses on an image displayed on the display unit 421 included in the output unit 42 of the communication status output apparatus 4. As such, the present embodiment also enables the user to perceive each parameter indicating the status of communication between the transmission modules 2B and 2C, and thus makes it easy to grasp the status of communication between these transmission modules for every single piece of send information. Furthermore, according to the present embodiment, sending power information associated with each piece of send information transmitted between transmission modules is neither included in the piece of send information, nor used in the communication status output processing. This can reduce the load related to sending of send information by a transmission module, as well as the load related to the communication status output processing in the communication status output apparatus.

As described above, the display unit 421 included in the output unit 42 according to the present embodiment displays sending/receiving pulses that indicate pieces of sending/receiving information for every single piece of send information in such a manner that they are lined up along the time axis in order of transmission of each piece of send information on the transmission path 2. This enables the user to easily grasp a temporal change in the status of communication between the transmission module 2B and the transmission module 2C. Note that the form of display of pieces of sending/receiving information on the display unit 421 shown in FIG. 12 merely serves as an example, and the form of display of pieces of sending/receiving information according to the invention of the present application is not limited to this.

Figure 15:
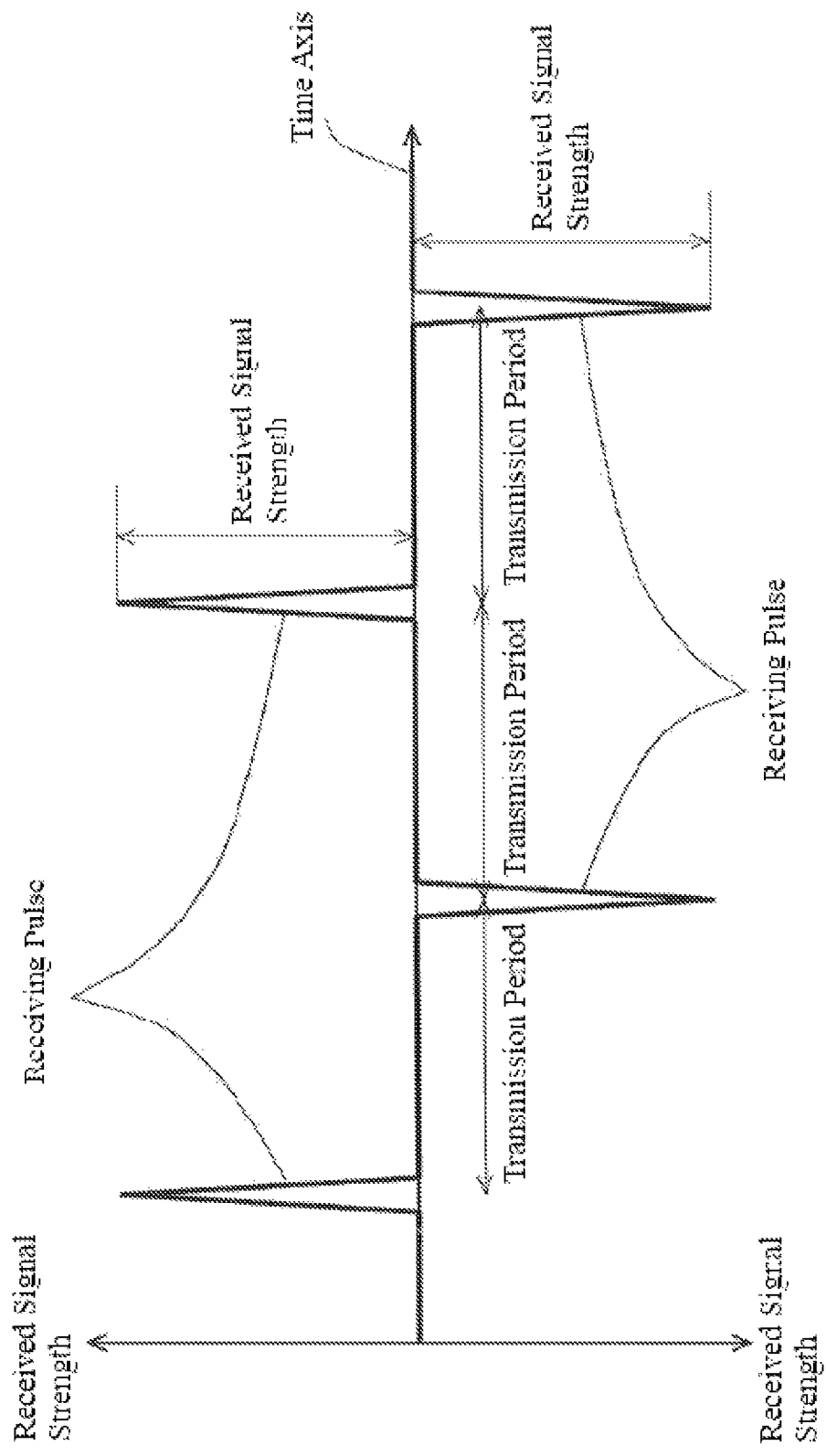
FIG. 15 is a third diagram showing an image that is displayed on the display unit included in the output unit of the communication status output apparatus shown in FIG. 7.

FIG. 15 shows another example of an image according to the present embodiment that is displayed on the display unit 421 included in the output unit 42. In FIG. 15, a receiving pulse indicating received signal strength information associated with send target information that was transmitted immediately before transmission of one piece of send target information, and a receiving pulse indicating the received signal strength information associated with this one piece of send target information, are presented as pulses that project in opposite directions from each other with respect to the time axis. That is to say, two adjacent receiving pulses are presented as pulses that project in opposite directions from each other with respect to the time axis. This makes it easy for the user to view a receiving pulse for every single piece of send information.

Note that the configurations of each modification example of Embodiment 1 described above are also applicable to the communication status output apparatus according to the present embodiment.

INDEX TO THE REFERENCE NUMERALS 1 information processing apparatus
2, 3 transmission path
2A, 2B, 2C, 2D, 3A, 3B, 3C, 3D transmission module
21 communication unit
211 receiving unit
212 sending unit
20 control unit
4 communication status output apparatus
41 sending/receiving information obtaining unit
42 output unit

The invention claimed is:

1. A communication status output apparatus that outputs a status of communication between a first transmission module and a second transmission module in a network in which send target information is transmitted sequentially via a plurality of transmission modules along a predetermined transmission path, the second transmission module being located downstream of the first transmission module on the predetermined transmission path, and the send target information being information to be processed by an information processing apparatus or information already processed by the information processing apparatus, the communication status output apparatus comprising:

an obtaining unit that obtains
- sending power information corresponding to sending power at the time of sending of send target information from the first transmission module,
- received signal strength information corresponding to received signal strength at the time of reception of send target information sent from the first transmission module by the second transmission module, and
- transmission period information corresponding to a transmission period between sending of send target information from the first transmission module and reception of the send target information by the second transmission module; and an output unit that outputs one pair of pieces of sending/receiving information for each piece of send target information in order of transmission, the one pair of pieces of sending/receiving information being composed of the sending power information and the received signal strength information associated with sending/receiving of one piece of send target information between the first transmission module and the second transmission module, wherein in outputting the pieces of sending/receiving information associated with the one piece of send target information, the output unit outputs the sending power information and the received signal strength information in such a manner that an interval therebetween corresponds to a transmission period between sending of the one piece of send target information from the first transmission module and reception of the one piece of send target information by the second transmission module.

2. The communication status output apparatus according to claim 1,
wherein each transmission module includes
- a receiving unit that receives send target information from an immediately upstream transmission module that is located immediately upstream of the own transmission module on the predetermined transmission path, and
- a sending unit that sends send target information to an immediately downstream transmission module that is located immediately downstream of the own transmission module on the predetermined transmission path,
the receiving unit receives, together with send target information, sending power information at the time of sending of the send target information from each of the immediately upstream transmission module and an upstream transmission module that is located upstream of the immediately upstream transmission module, as well as sending time information corresponding to time of sending of the send target information from each of the immediately upstream transmission module and the upstream transmission module,
the sending unit sends, together with send target information, sending power information at the time of sending of the send target information from each of the own transmission module, the immediately upstream transmission module, and the upstream transmission module, as well as sending time information corresponding to time of sending of the send target information from each of the own transmission module, the immediately upstream transmission module, and the upstream transmission module, and
the obtaining unit obtains, from the second transmission module out of the first transmission module and the second transmission module that serve as two arbitrary transmission modules selected as transmission modules whose communication status is to be output on the predetermined transmission path,
- the sending power information at the time of sending of send target information from the first transmission module,
- the sending time information at the time of sending of the send target information from the first transmission module,
- the received signal strength information at the time of reception of the send target information by the second transmission module, and
- receiving time information corresponding to time of reception of the send target information by the second transmission module.

3. The communication status output apparatus according to claim 1,
wherein the first transmission module is located immediately upstream of the second transmission module on the predetermined transmission path, and
in outputting the pieces of sending/receiving information associated with the one piece of send target information, the output unit outputs the sending power information and the received signal strength information in such a form that a correlation between sending power at the time of sending of the one piece of send target information from the first transmission module and received signal strength at the time of reception of the one piece of send target information by the second transmission module corresponds to a correlation between the sending power information and the received signal strength information associated with sending/receiving of the one piece of send target information.

4. The communication status output apparatus according to claim 1,
wherein the output unit includes a display unit that displays the pieces of sending/receiving information in the form of pulses, and
in displaying the pieces of sending/receiving information associated with the one piece of send target information, the display unit displays
- a magnitude of sending power at the time of sending of the one piece of send target information from the first transmission module as a magnitude of a sending pulse indicating the sending power information,
- a magnitude of received signal strength at the time of reception of the one piece of send target information by the second transmission module as a magnitude of a receiving pulse indicating the received signal strength information, and
- one pair of the sending pulse and the receiving pulse indicating the pieces of sending/receiving information associated with the one piece of send target information in such a manner that an interval therebetween corresponds to the transmission period between sending of the one piece of send target information from the first transmission module and reception of the one piece of send target information by the second transmission module.

5. The communication status output apparatus according to claim 4,
wherein the display unit displays the sending pulse and the receiving pulse indicating the pieces of sending/receiving information for every single piece of send target information in such a manner that the pulses are lined up along a time axis indicating passage of time in order of transmission of each piece of send target information on the predetermined transmission path, and that the sending pulse and the receiving pulse project in opposite directions from each other with respect to the time axis.

6. A communication status output apparatus that outputs a status of communication between a first transmission module and a second transmission module in a network in which send target information is transmitted sequentially via a plurality of transmission modules along a predetermined transmission path, the second transmission module being located downstream of the first transmission module on the predetermined transmission path, and the send target information being information to be processed by an information processing apparatus or information already processed by the information processing apparatus, the communication status output apparatus comprising:
an obtaining unit that obtains
received signal strength information corresponding to received signal strength at the time of reception of send target information sent from the first transmission module by the second transmission module, and
transmission period information corresponding to a transmission period between sending of send target information from the first transmission module and reception of the send target information by the second transmission module; and
an output unit that outputs the received signal strength information for each piece of send target information in order of transmission,
wherein the output unit outputs the received signal strength information associated with one piece of send target information in such a manner that an interval between output of the received signal strength information associated with send target information transmitted immediately before transmission of the one piece of send target information and output of the received signal strength information associated with the one piece of send target information corresponds to a transmission period between sending of the one piece of send target information from the first transmission module and reception of the one piece of send target information by the second transmission module.

7. The communication status output apparatus according to claim 6,
wherein each transmission module includes
a receiving unit that receives send target information from an immediately upstream transmission module that is located immediately upstream of the own transmission module on the predetermined transmission path, and
a sending unit that sends send target information to an immediately downstream transmission module that is located immediately downstream of the own transmission module on the predetermined transmission path,
the receiving unit receives, together with send target information, sending time information corresponding to time of sending of the send target information from each of the immediately upstream transmission module and an upstream transmission module that is located upstream of the immediately upstream transmission module,
the sending unit sends, together with send target information, sending time information corresponding to time of sending of the send target information from each of the own transmission module, the immediately upstream transmission module, and the upstream transmission module, and
the obtaining unit obtains, from the second transmission module out of the first transmission module and the second transmission module that serve as two arbitrary transmission modules selected as transmission modules whose communication status is to be output on the predetermined transmission path,
the sending time information at the time of sending of the send target information from the first transmission module,
the received signal strength information at the time of reception of the send target information by the second transmission module, and
receiving time information corresponding to time of reception of the send target information by the second transmission module.

8. The communication status output apparatus according to claim 6,
wherein the output unit includes a display unit that displays the received signal strength information in the form of pulses, and
in displaying the received signal strength information associated with the one piece of send target information, the display unit displays
a magnitude of received signal strength at the time of reception of the one piece of send target information by the second transmission module as a magnitude of a receiving pulse indicating the received signal strength information, and
a receiving pulse indicating the received signal strength information associated with the send target information transmitted immediately before transmission of the one piece of send target information and a receiving pulse indicating the received signal strength information associated with the one piece of send target information in such a manner that an interval therebetween corresponds to the transmission period between sending of the one piece of send target information from the first transmission module and reception of the one piece of send target information by the second transmission module.

9. The communication status output apparatus according to claim 8,
wherein the display unit displays the receiving pulse indicating the received signal strength information associated with the send target information transmitted immediately before transmission of the one piece of send target information and the receiving pulse indicating the received signal strength information associated with the one piece of send target information in such a manner that the pulses are lined up along a time axis in order of transmission of each piece of send target information on the predetermined transmission path, and that the receiving pulse indicating the received signal strength information associated with the send target information transmitted immediately before transmission of the one piece of send target information and the receiving pulse indicating the received signal strength information associated with the one piece of send target information project in opposite directions from each other with respect to the time axis.

10. A communication status output method for outputting a status of communication between a first transmission module and a second transmission module in a network in which send target information is transmitted sequentially via a plurality of transmission modules along a predetermined transmission path, the second transmission module being located downstream of the first transmission module on the predetermined transmission path, and the send target information being information to be processed by an information processing apparatus or information already processed by the information processing apparatus, the communication status output method comprising:

an obtaining step of obtaining sending power information corresponding to sending power at the time of sending of send target information from the first transmission module, received signal strength information corresponding to received signal strength at the time of reception of send target information sent from the first transmission module by the second transmission module, and transmission period information corresponding to a transmission period between sending of send target information from the first transmission module and reception of the send target information by the second transmission module; and an output step of outputting one pair of pieces of sending/receiving information for each piece of send target information in order of transmission, the one pair of pieces of sending/receiving information being composed of the sending power information and the received signal strength information associated with sending/receiving of one piece of send target information between the first transmission module and the second transmission module, wherein in outputting the pieces of sending/receiving information associated with the one piece of send target information in the output step, the sending power information and the received signal strength information are output in such a manner that an interval therebetween corresponds to a transmission period between sending of the one piece of send target information from the first transmission module and reception of the one piece of send target information by the second transmission module.

11. A communication status output method for outputting a status of communication between a first transmission module and a second transmission module in a network in which send target information is transmitted sequentially via a plurality of transmission modules along a predetermined transmission path, the second transmission module being located downstream of the first transmission module on the predetermined transmission path, and the send target information being information to be processed by an information processing apparatus or information already processed by the information processing apparatus, the communication status output method comprising:

an obtaining step of obtaining received signal strength information corresponding to received signal strength at the time of reception of send target information sent from the first transmission module by the second transmission module, and transmission period information corresponding to a transmission period between sending of send target information from the first transmission module and reception of the send target information by the second transmission module; and an output step of outputting the received signal strength information for each piece of send target information in order of transmission, wherein in the output step, the received signal strength information associated with one piece of send target information is output in such a manner that an interval between output of the received signal strength information associated with send target information transmitted immediately before transmission of the one piece of send target information and output of the received signal strength information associated with the one piece of send target information corresponds to a transmission period between sending of the one piece of send target information from the first transmission module and reception of the one piece of send target information by the second transmission module.

12. A transmission module that is used in a network in which send target information is transmitted sequentially along a predetermined transmission path, and that outputs a status of communication between the own transmission module and an upstream transmission module located upstream of the own transmission module on the predetermined transmission path, the send target information being information to be processed by an information processing apparatus or information already processed by the information processing apparatus, the transmission module comprising:

an obtaining unit that obtains sending power information corresponding to sending power at the time of sending of send target information from the upstream transmission module, received signal strength information corresponding to received signal strength at the time of reception of send target information sent from the upstream transmission module by the own transmission module, and transmission period information corresponding to a transmission period until the own transmission module receives send target information sent from the upstream transmission module; and an output unit that outputs one pair of pieces of sending/receiving information for each piece of send target information in order of transmission, the one pair of pieces of sending/receiving information being composed of the sending power information and the received signal strength information associated with sending/receiving of one piece of send target information between the upstream transmission module and the own transmission module, wherein in outputting the pieces of sending/receiving information associated with the one piece of send target information, the output unit outputs the sending power information and the received signal strength information in such a manner that an interval therebetween corresponds to a transmission period until the own transmission module receives the one piece of send target information sent from the upstream transmission module.

13. A transmission module that is used in a network in which send target information is transmitted sequentially along a predetermined transmission path, and that outputs a status of communication between the own transmission module and an upstream transmission module located upstream of the own transmission module on the predetermined transmission path, the send target information being information to be processed by an information processing apparatus or information already processed by the information processing apparatus, the transmission module comprising:

an obtaining unit that obtains received signal strength information corresponding to received signal strength at the time of reception of send target information sent from the upstream transmission module by the own transmission module, and transmission period information corresponding to a transmission period until the own transmission module receives send target information sent from the upstream transmission module; and an output unit that outputs the received signal strength information for each piece of send target information in order of transmission, wherein the output unit outputs the received signal strength information associated with one piece of send target information in such a manner that an interval between output of the received signal strength information associated with send target information transmitted immediately before transmission of the one piece of send target information and output of the received signal strength information associated with the one piece of send target information corresponds to a transmission period between sending of the one piece of send target information from the upstream transmission module and reception of the one piece of send target information by the own transmission module.

* * * * *